(12) United States Patent
Fridgen et al.

(10) Patent No.: US 11,930,733 B1
(45) Date of Patent: Mar. 19, 2024

(54) NITROGEN LOSS PREDICTION AND MITIGATION METHODS AND SYSTEMS

(71) Applicant: ADVANCED AGRILYTICS HOLDINGS, LLC, Indianapolis, IN (US)

(72) Inventors: Jon J. Fridgen, Lancaster, KY (US); William Kess Berg, Clayton, IN (US)

(73) Assignee: ADVANCED AGRIL YTICS HOLDINGS, LLC, Indianapolis, IN (US)

( * ) Notice: Subject to any disclaimer, the term of this patent is extended or adjusted under 35 U.S.C. 154(b) by 0 days.

(21) Appl. No.: 18/136,271

(22) Filed: Apr. 18, 2023

(51) Int. Cl.
*A01C 21/00* (2006.01)
*G06N 5/04* (2023.01)

(52) U.S. Cl.
CPC .......... *A01C 21/007* (2013.01); *A01C 21/005* (2013.01); *G06N 5/04* (2013.01)

(58) Field of Classification Search
CPC ..... A01C 21/007; A01C 21/005; A01C 21/00; G06N 5/04; G06N 5/00
See application file for complete search history.

(56) References Cited

U.S. PATENT DOCUMENTS

| 2015/0370935 A1* | 12/2015 | Starr | G06Q 10/06 703/11 |
| 2016/0180473 A1* | 6/2016 | Groeneveld | A01C 21/007 705/7.25 |

FOREIGN PATENT DOCUMENTS

WO WO-2022125834 A1 * 6/2022 ........... C01B 32/384

* cited by examiner

*Primary Examiner* — Christopher J. Novosad
(74) *Attorney, Agent, or Firm* — MARSHALL, GERSTEIN & BORUN LLP; Randall G. Rueth

(57) ABSTRACT

A computing system includes a processor and a memory having instructions stored thereon that, when executed by the one or more processors, cause the computing system to: receive yield data for a field and a spatial data set; process the yield data and the spatial data to generate a nitrogen loss spatial map layer; and generate a prescription. A computer-implemented method includes receiving yield data for a field and a spatial data set; processing the yield data and the spatial data to generate a nitrogen loss spatial map layer; and generating a digital agricultural prescription. A non-transitory computer readable medium includes program instructions that when executed by one or more processors, cause a computer to: receive yield data for a field and a spatial data set; process the yield data and the spatial data to generate a nitrogen loss spatial map layer; and generate a prescription.

20 Claims, 21 Drawing Sheets

330

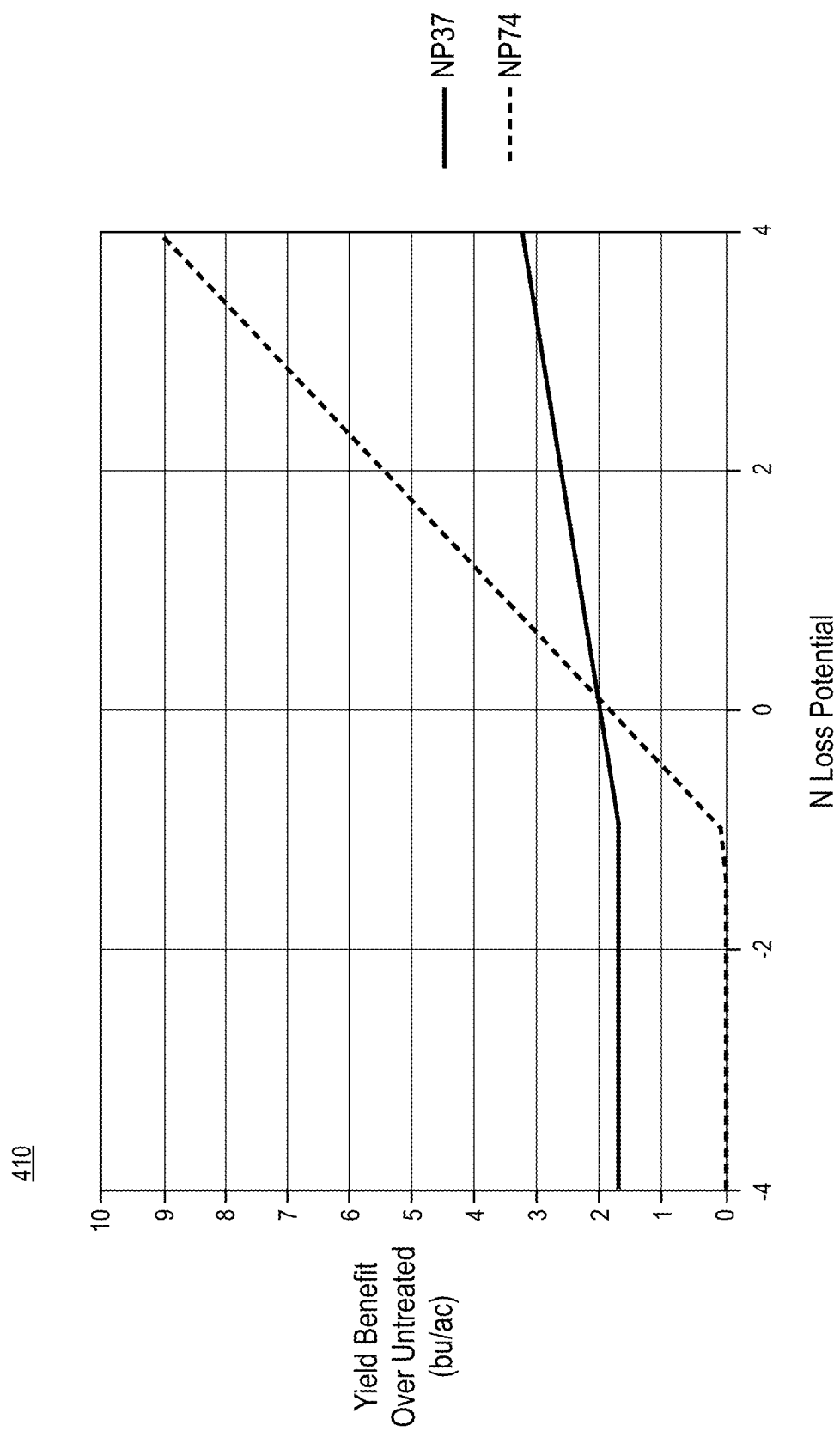

NITROGEN LOSS PREDICTION AND MITIGATION METHODS AND SYSTEMS

FIELD OF THE DISCLOSURE

The present disclosure is directed to methods and systems for quantifying and mitigating of nitrogen loss in agricultural fields, and more particularly, to generating nitrogen loss spatial maps and nitrogen protectant recommendations.

BACKGROUND

Nitrogen is an essential nutrient for plant growth and is a key factor in determining crop yield. Understanding nitrogen dynamics helps growers to maximize yield by performing proper nitrogen fertilization, for example, to make informed decisions about how much nitrogen to apply and when to apply it, reducing the risk of nitrogen leaching and runoff, which can negatively impact water quality. Understanding nitrogen dynamics is important for increasing nitrogen use efficiency (e.g., understanding nitrogen dynamics can help growers adjust their nitrogen management practices to improve nitrogen use efficiency and reduce the amount of nitrogen that is lost to the environment), and to enhance crop growth and yield (e.g., by optimizing nitrogen fertilizer application and reducing nitrogen losses, growers can improve crop growth and increase yields, which ultimately leads to increased profits and food security). Thus, understanding nitrogen dynamics in growing operations is important to maximizing yield as it allows growers to optimize nitrogen fertilizer application and improve nitrogen use efficiency, resulting in enhanced crop growth and increased yields.

However, nitrogen dynamics are difficult to quantify because nitrogen dynamics are a complex process that depends on several factors, including soil series (e.g., different soil series have different levels of permeability, water-holding capacity and organic matter (OM) which affects nitrogen dynamics), climate (e.g., weather conditions, such as temperature, precipitation, and evaporation, can impact nitrogen dynamics), crop type (e.g., different crops have varying nitrogen requirements and uptake patterns, which affect the amount of nitrogen available), fertilizer type and application method (e.g., the type of nitrogen fertilizer used and the method of application can influence nitrogen dynamics), land use and management practices (e.g., land use and management practices, such as tillage, irrigation, and crop rotation, can also impact nitrogen dynamics), etc. These factors interact in complex ways, making it difficult to quantify nitrogen dynamics. Additionally, nitrogen dynamics can occur through several pathways, including leaching, denitrification, volatilization, and runoff, which adds to the complexity of quantifying nitrogen dynamics.

Prescriptive agriculture is dependent upon on describing the underlying agricultural environment of a given agricultural field. Agricultural management strategies (e.g., agricultural prescriptions) are dependent on understanding spatial variability. However, even if spatial variability is fully understood, the key characteristics that have an impact on yield are paramount for developing any management strategy including agricultural prescriptions.

For example, two adjacent fields may have very different respective factors influencing yield. Moreover, the same field may have very different yield responses over time due to factors such as weather. Thus, the task of quantifying the behavior of key characteristics affecting yield is a subtle and difficult problem. Therefore, due to the complexity of nitrogen dynamics, quantifying nitrogen loss is challenging, but understanding its potential and how it can be minimized is critical to maximizing yield and reducing the impact of nitrogen loss on the environment.

Accordingly, there is an opportunity for improved platforms and technologies to quantify the underlying agricultural environment of agricultural fields.

BRIEF SUMMARY

In an aspect, a computing system for quantifying and mitigating nitrogen loss in agricultural fields by generating nitrogen loss spatial maps and nitrogen protectant recommendations includes one or more processors; and one or more memories having instructions stored thereon that, when executed by the one or more processors, cause the computing system to: (i) receive, via the one or more processors, a plurality of yield data values each corresponding to a respective portion of an agricultural field; (ii) receive, via the one or more processors, a spatial data set indicative of environmental characteristics of the field; (iii) process the plurality of yield data values and the spatial data set to generate a nitrogen loss spatial map layer including a nitrogen loss index value corresponding to each respective portion of the agricultural field; and (iv) generate, based on the nitrogen loss spatial map layer, a digital agricultural prescription including a respective prescription value of a nitrogen protectant product for each respective portion of the agricultural field.

In another aspect, a computer-implemented method for quantifying and mitigating nitrogen loss in agricultural fields by generating nitrogen loss spatial maps and nitrogen protectant recommendations includes (i) receiving, via one or more processors, a plurality of yield data values each corresponding to a respective portion of an agricultural field; (ii) receiving, via one or more processors, a spatial data set indicative of environmental characteristics of the field; (iii) processing the plurality of yield data values and the spatial data set to generate a nitrogen loss spatial map layer including a nitrogen loss index value corresponding to each respective portion of the agricultural field; and (iv) generating, based on the nitrogen loss spatial map layer, a digital agricultural prescription including a respective prescription value of a nitrogen protectant product for each respective portion of the agricultural field.

In yet another aspect, a non-transitory computer readable medium includes program instructions that when executed by one or more processors, cause a computer to: (i) receive, via the one or more processors, a plurality of yield data values each corresponding to a respective portion of an agricultural field; (ii) receive, via the one or more processors, a spatial data set indicative of environmental characteristics of the field; (iii) process the plurality of yield data values and the spatial data set to generate a nitrogen loss spatial map layer including a nitrogen loss index value corresponding to each respective portion of the agricultural field; and (iv) generate, based on the nitrogen loss spatial map layer, a digital agricultural prescription including a respective prescription value of a nitrogen protectant product for each respective portion of the agricultural field.

BRIEF DESCRIPTION OF THE DRAWINGS

FIG. 4B depicts an example line chart showing response of Instinct rates by field environment, according to some aspects.

DETAILED DESCRIPTION

Overview

The present aspects may relate to, inter alia, methods and systems for improved quantification and mitigating of nitrogen loss in agricultural fields, and more particularly, to generating nitrogen loss spatial maps and nitrogen protectant recommendations.

The present techniques include methodologies for quantifying nitrogen loss potential within agricultural fields using a combination of yield data and/or imagery and topographic information. This information may then be used to generate variable rate recommendations for products that slow the microbial conversion of ammonium to nitrate within the soil. Trial results are provided herein that provide an overview of the results observed with several different products.

Exemplary Computing Environment

Figure 1:
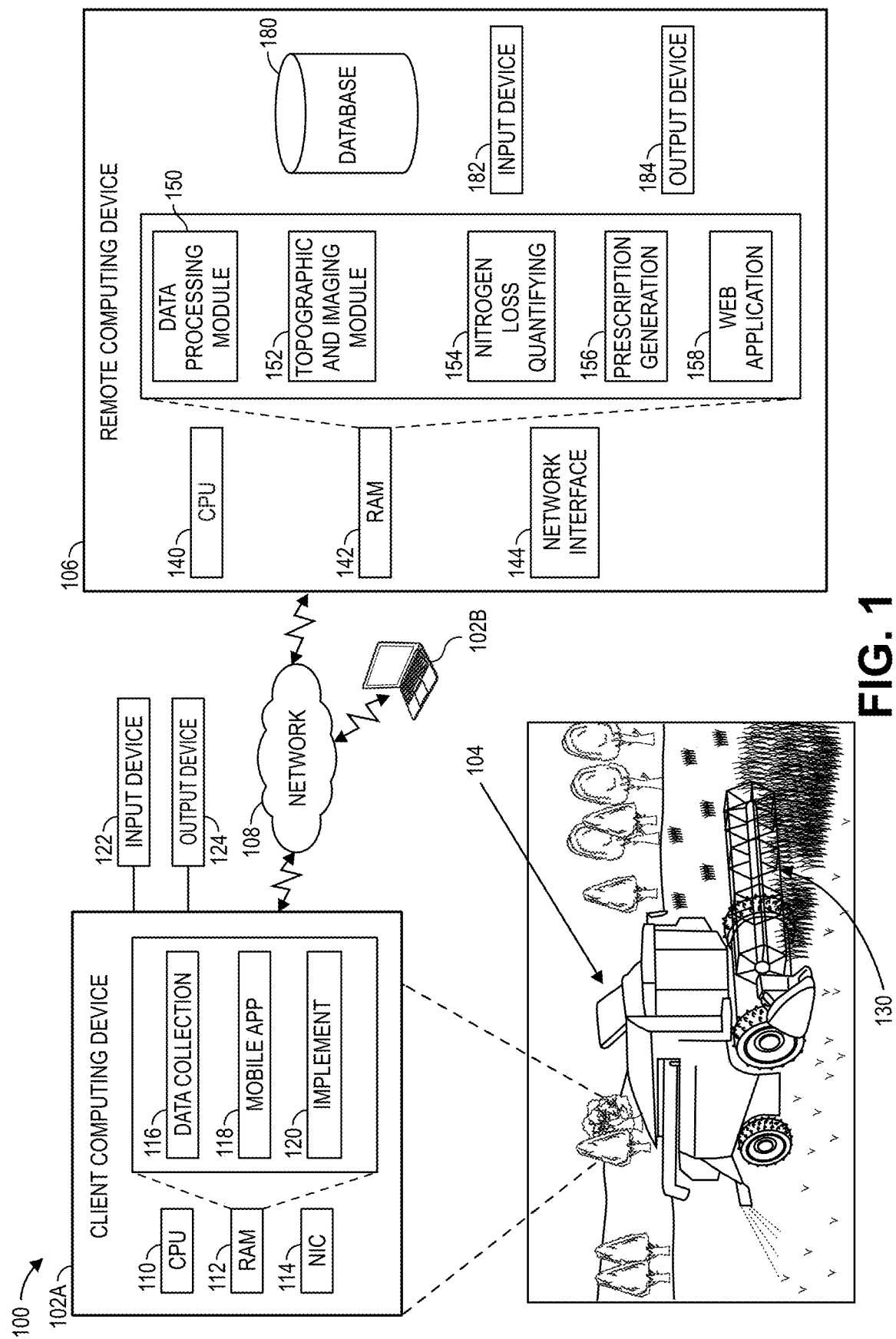
FIG. 1 depicts an exemplary computing environment in which the techniques disclosed herein may be implemented, according to some aspects.

FIG. 1 depicts an exemplary computing environment 100 in which the techniques disclosed herein may be implemented, according to an aspect.

The environment 100 includes a client computing device 102A, a client computing device 102B, an implement 104, a remote computing device 106, and a network 108. Some aspects may include a plurality of implements 104, and/or a plurality of remote computing devices 106. Multiple and/or separate networks may communicatively couple different components of the environment 100, such as the client computing device 102A and the implement 104, and/or the client computing device 102A and the remote computing device 106, etc.

The client computing device 102A and the client computing device 102B may be an individual server, a group (e.g., cluster) of multiple servers, or another suitable type of computing device or system (e.g., a collection of computing resources). For example, the client computing device 102A may be a mobile computing device (e.g., a server, a mobile computing device, a smart phone, a tablet, a laptop, a wearable device, etc.). In some aspects the client computing device 102A may be a personal portable device of a user. In some aspects the client computing device 102A may be temporarily or permanently affixed to the implement 102A. For example, the client computing device 102A may be the property of a customer, an agricultural analytics (or "agrilytics") company, an implement manufacturer, etc. The client computing device 102B may be a laptop computer or other device that a user (e.g., an agronomist, customer, grower, etc.) use to access the remote computing device 106 (e.g., to receive/retrieve an agricultural prescription, a shapefile, a spatial map, etc.).

The client computing devices 102 each include, respectively, a processor 110, a memory 112 and a network interface controller (NIC) 114. The processor 110 may include any suitable number of processors and/or processor types, such as CPUs and one or more graphics processing units (GPUs). Generally, the processor 110 is configured to execute software instructions stored in a memory 112. The memory 112 may include one or more persistent memories (e.g., a hard drive/solid state memory) and stores one or more set of computer executable instructions/modules, including a data collection module 116, a mobile application module 118, and an implement control module 120, as described in more detail below. More or fewer modules may be included in some aspects.

The NIC 114 may include any suitable network interface controller(s), such as wired/wireless controllers (e.g., Ethernet controllers), and facilitate bidirectional/multiplexed networking over the network 108 between the client computing device 102A and other components of the environment 100 (e.g., another client computing device 102A, the client computing device 102B, the implement 104, the remote computing device 106, etc.).

The one or more modules stored in the memory 112 may include respective sets of computer-executable instructions implementing specific functionality. For example, in an aspect, the data collection module 116 includes a set of computer-executable instructions for collecting a machine data set from an implement (e.g., the implement 104). The machine data collection module 116 may include a respective set of instructions for retrieving/receiving data from a plurality of different implements. For example, a first set of instructions may be configured to retrieve/receive machine data from a first tractor manufacturer, while a second set of instructions is for retrieving/receiving machine data from a second tractor manufacturer.

In another aspect, the first and second set of instructions may be for, respectively, receiving/retrieving data from tillage equipment, a combine, and/or a harvester. Of course, some libraries of instructions may be provided by the manufacturers of various implements and/or attachments, and may be loaded into the memory 112 and used by the data collection module 116.

The data collection module 116 may retrieve/receive machine data from a separate hardware device (e.g., a client computing device 102A that is part of the implement 104) or directly from one or more of the sensors of the implement 104 and/or one or more of the attachments 130 coupled to the implement 104, if any.

The machine data may include any information generated by the client computing device 102A, the implement 104, and/or the attachments 130. For example, the machine data may include sensor measurements of planter downforce, soil resistance to planting depth, engine load data, fuel burn data, draft, fuel consumption, wheel slippage, yield data, elevation data and/or derivatives thereof, etc. The machine data may include application/treatment rates and a geographic identifier (e.g., one or more location coordinates). The machine data may include one or more time series, such that one or more measured values are represented in a single data set at a common interval (e.g., one-second). For example, the machine data may include a first time series of fertilizer application rate at a one-second interval, a second time series of seed application, etc.

The machine data may include respective location data. For example, the client computing device 102A may add location metadata to the machine data, such that the machine data reflects an absolute and/or relative geographical position (i.e., location, coordinate, offset, heading, etc.) of the client computing device 102A, the implement 104, and/or the attachments 130 within the agricultural field at the precise moment that the client computing device 102A captures the machine data. The location data may include high-resolution GPS data, in some aspects. Thus, a time series may include a respective location for each element within the time series.

Some sensors and/or agricultural equipment may generate machine data that is received by the client computing device 102A that already includes location metadata added by the sensors and/or agricultural equipment. In an aspect wherein the machine data comprises a time series, each value of the time series may include a respective geographic metadata entry.

The data collection module 116 may receive and/or retrieve the machine data via an API through a direct hardware interface (e.g., via one or more wires) and/or via a network interface (e.g., via the network 108). The data collection module 116 may collect (e.g., pull the machine data from a data source and/or receive machine data pushed by a data source) at a predetermined time interval. The time interval may be of any suitable duration (e.g., once per second, once or twice per minute, every 10 minutes, etc.). The time interval may be short, in some aspects (e.g., once every 10 milliseconds). The data collection module 116 may include instructions for modifying and/or storing the machine data. For example, the data collection module 116 may parse the raw machine data into a data structure. The data collection module 116 may write the raw machine data onto a disk (e.g., a hard drive in the memory 112). In some aspects, the data collection module 116 may transfer the raw machine data, or modified machine data, to a remote computing system/device, such as the remote computing device 106. The transfer may, in some aspects, take the form of an SQL insert command. In effect, the data collection module 116 performs the function of receiving, processing, storing, and/or transmitting the machine data. In some aspects, the data collection module 116 may retrieve an identifier (e.g., a treatment identifier, a trial identifier, etc.) from another module. The data collection module 116 may merge the identifier into the machine data, and associate the identifier with the collected machine data.

The mobile application module 118 may include computer-executable instructions that display one or more graphical user interfaces (GUIs) on the output device 124 and/or receives user input via the input device 122. For example, the mobile application module 118 may correspond to a mobile computing application (e.g., an Android, iPhone, or other) computing application of an agrilytics company. The mobile computing application may be a specialized application corresponding to the type of computing device embodied by the client computing device 102A. For example, in aspects where the client computing device 102A is a mobile phone, the mobile application module 118 may correspond to a mobile application downloaded for iPhone. When the client computing device 102A is a tablet, the mobile application module 118 may correspond to an application with tablet-specific features. Exemplary GUIs that may be displayed by the mobile application module 118, and with the user may interact, are discussed below.

The mobile application module 118 may include instructions for receiving/retrieving mobile application data from the remote computing device 106. In particular, the mobile application module 118 may include instructions for transmitting user-provided login credentials, receiving an indication of successful/unsuccessful authentication, and other functions related to the user's operation of the mobile application. The mobile application module 118 may include instructions for receiving/retrieving, rendering, and displaying visual maps in a GUI. Specifically, the application module 118 may include computer-executable instructions for displaying one or more map layers in the of the client computing device 102A. For example, the map layers may be used to depict comparisons of one or more fields generated using the present nutrient application rate recommendation techniques.

The implement control module 120 includes computer-executable instructions for controlling the operation of an implement (e.g., the implement 104) and/or the attachments 130. The implement control module 120 may control the implement 104 while the implement 104 and/or attachments 130 are in motion (e.g., while the implement 104 and/or attachments 130 are being used in a farming capacity). For example, the implement control module 120 may include an instruction that, when executed by the processor 110 of the client computing device 102A, causes the implement 104 to accelerate or decelerate. In some aspects, the implement control module 120 may cause one of the attachments 130 to raise or lower the disc arm of tillage equipment, or to apply more or less downward or upward pressure on the ground. The implement 130 may control an application rate of one or more nutrients (e.g., phosphorus, nitrogen, etc.) in response to an agricultural prescription. The implement control module 130 may include a set of library functions for controlling the implement 130 and/or one or more agricultural prescriptions.

Herein, an "agricultural prescription" or "prescription" refers to a set of computer-executable instructions that may be loaded into the memory of a device (e.g., the client computing device 102A) and executed to cause one or more particular agricultural operations to occur, in either an implement (e.g., the implement 104) and/or one or more attachments (e.g., the attachments 130). Operations that the prescription may cause to be performed include, without limitation, steering, variable-rate seeding, variable-rate application of liquid product such as nitrogen inhibitor, and so on. The prescription may be a digital file that is encoded in a format common to the agricultural industry, or a proprietary data format, in some aspects.

Practically, the implement control module 120 has all of the control of the implement 104 and/or attachments 130 as does the human operator, and more. The implement control module 120 may include a respective set of instructions for controlling a plurality of implements. For example, a first set of instructions may be configured to control an implement of a first tractor manufacturer, while a second set of instructions is configured to control an implement of a second tractor manufacturer.

In another aspect, the first and second set of instructions may be configured to control, respectively, tillage equipment, a combine and/or a harvester. Of course, many configurations and uses are envisioned beyond those provided by way of example. The control module 120 may include computer-executable instructions for executing one or more agricultural prescriptions with respect to a field. For example, the control module 120 may execute an agricultural prescription that specifies, for a given agricultural field, a path for the implement 104 to follow within the field, and an varying application rate of a chemical (e.g., a fertilizer, an herbicide, a pesticide, etc.) or a seed to apply at various points along the path. The control module 120 may analyze the current location of the implement 104 and/or the attachments 130 in real-time (e.g., as the control module 120 executes the agricultural prescription). The computer-executable instructions for executing the one or more agricultural prescriptions may be based on comparisons generated by the environmental matching algorithm. In some aspects, the computer-executable instructions may directly analyze the output of the environmental matching algorithm to determine one or more actions for the implement 104 to take.

In some aspects, one or more components of the computing device 102A may be embodied by one or more virtual instances (e.g., a cloud-based virtualization service). In such cases, one or more client computing device 102A and/or 102B may be included in a remote data center (e.g., a cloud computing environment, a public cloud, a private cloud, etc.). For example, a remote data storage module (not depicted) may remotely store data received/retrieved by the computing device 102A. The client computing device 102A may be configured to communicate bidirectionally via the network 108 with the implement 104 and/or an attachments 130 that may be coupled to the implement 104. The implement 104 and/or the attachments 130 may be configured for bidirectional communication with the client computing device 102A via the network 108.

The client computing device 102A may receive/retrieve data (e.g., machine data) from the implement 104, and/or the client computing device 102A may transmit data (e.g., instructions) to the implement 104. The client computing device 102A may receive/retrieve data (e.g., machine data) from the attachments 130, and/or may transmit data (e.g., instructions) to the attachments 130. The implement 104 and the attachments 130 will now be described in further detail.

The implement 104 may be any suitable powered or unpowered equipment/machine or machinery, including without limitation: a tractor, a combine, a cultivator, a cultipacker, a plow, a harrow, a stripper, tillage equipment, a planter, a baler, a sprayer, an irrigator, a sorter, an harvester, etc. The implement 104 may include one or more sensors (not depicted) and the implement 104 may be coupled to one or more attachments 130. For example, the implement 104 may include one or more sensors for measuring respective implement values of liquid application rate, seed application rate, engine load data, fuel burn data, draft sensing, fuel consumption, wheel slippage, etc. Many aspects including more or fewer sensors measuring more or fewer implement values are envisioned. The implement 104 may be a gas/diesel, electric, or hybrid vehicle operated by a human operator and/or autonomously (e.g., as an autonomous/driverless agricultural vehicle).

The attachments 130 may be any suitable powered or unpowered equipment/machinery permanently or temporarily affixed/attached to the implement 104 by, for example, a hitch, yoke or other suitable mechanism. The attachments 130 may include any of the types of equipment that the implement 104 may comprise (e.g., tillage equipment). The attachments 130 may include one or more sensors (not depicted) that may differ in number and/or type according to the respective type of the attachments 130 and the particular aspect/scenario. For example, tillage attachments 130 may include one or more soil depth sensors. It should be appreciated that many attachments 130 sensor configurations are envisioned. For example, the attachments 130 may include one or more cameras. The attachments 130 may be connected to the implement 104 via wires or wirelessly, for both control and communications. For example, attachments 130 may be coupled to the client computing device 102A of the implement 104 via a wired and/or wireless interface for data transmission (e.g., cellular data via 4G/5G, IEEE 802.11, Wi-Fi, etc.) and main/auxiliary control (e.g., 7-pin, 4-pin, etc.). The client computing device 102A may communicate bidirectionally (i.e., transmit data to, and/or receive data from) with the remote computing device 106 via the network 108.

The client computing device 102A includes an input device 122 and an output device 124. The input device 122 may include any suitable device or devices for receiving input, such as one or more microphone, one or more camera, a hardware keyboard, a hardware mouse, a capacitive touch screen, etc. The output device 124 may include any suitable device for conveying output, such as a hardware speaker, a computer monitor, a touch screen, etc. In some cases, the input device 122 and the output device 124 may be integrated into a single device, such as a touch screen device that accepts user input and displays output. The client computing device 102A may be associated with (e.g., leased, owned, and/or operated by) an agrilytics company.

The client computing device 102B may include a processor, a memory and one or more applications (e.g., a web browser). A user (e.g., agronomist, grower, field manager, etc.) may use the client computing device 102B to access a web application served by the remote computing device 106. The user may provide one or more inputs via the client computing device 102B (e.g., a selection of a nitrogen protectant product, a selection of one or more agricultural fields, a shapefile corresponding to one or more agricultural fields, elevation data corresponding to one or more agricultural fields, etc.).

The network 108 may be a single communication network, or may include multiple communication networks of one or more types (e.g., one or more wired and/or wireless local area networks (LANs), and/or one or more wired and/or wireless wide area networks (WANs) such as the Internet). The network 108 may enable bidirectional communication between the client computing device 102A and the remote computing device 106, and/or between multiple client computing devices 102A and the client computing device 102B, for example.

The remote computing device 106 includes a processor 140, a memory 142, and a NIC 144. The processor 140 may include any suitable number of processors and/or processor types, such as CPUs and one or more graphics processing units (GPUs). Generally, the processor 140 is configured to execute software instructions stored in the memory 142. The memory 142 may include one or more persistent memories (e.g., a hard drive/solid state memory) and stores one or more set of computer executable instructions/modules, as discussed below. For example, the remote computing device 106 may include a data processing module 150, a topographic and imaging module 152, a nitrogen loss quantifying module 154; a prescription generation module 156; and a web application module 158.

The NIC 144 may include any suitable network interface controller(s), such as wired/wireless controllers (e.g., Ethernet controllers), and facilitate bidirectional/multiplexed networking over the network 106 between the remote computing device 106 and other components of the environment 100 (e.g., another remote computing device 106, the client computing device 102A, the client computing device 102B, etc.).

The one or more modules stored in the memory 142 may include respective sets of computer-executable instructions implementing specific functionality. For example, in an aspect, the data processing module 150 includes computer-executable instructions for receiving/retrieving data from the client computing device 102A, the implement 104, and/or the attachments 130. For example, the data processing module 150 may include instructions that when executed by the processor 140, cause the remote computing device 106 to receive/retrieve machine data. The data processing module 150 may include further instructions for storing the machine data in one or more tables of the database 180. The data processing module 150 may store raw machine data, or processed data. The data processing module 150 may include instructions for processing the raw machine data to generate processed data. For example, the processed data may be data that is represented using data types data of a programming language (e.g., R, C#, Python, JavaScript, etc.).

The data processing module 150 may include instructions for validating the data types present in the processed data. For example, the data processing module 150 may verify that a value is present (i.e., not null) and is within a particular range or of a given size/structure. In some aspects, the data processing module 150 may transmit processed data to/from an electronic database in response to a query, or request, from the client computing device 102A. The data processing module 150 may transmit the processed data via HTTP or via another data transfer suitable protocol. In some aspects, the data processing module 150 may transform data received from the data collection module 116 of the client computing device 102A. For example, the data processing module 150 may transform raw machine data into a spatial data format.

The topographic and imaging module 152 may include instructions for analyzing raw machine data and computing topographic data attributes. For example, the topographic and imaging module 152 may be configured to generate relative elevation and slope/soil wetness index (SWI) data based on raw machine data. The topographic and imaging module 152 may store topographic data attributes in an electronic database. The topographic and imaging module 152 may be configured to retrieve and/or provide topographic data to other modules in the remote computing device 106. The topographic data may take the form of raw data (e.g., a list of geographic coordinates and elevation in feet above sea level) or more complex data, such as an elevation map layer/spatial data file. The topographic and imaging module 152 may source elevation data from public sources, such as the United States Geological Survey (USGS) National Elevation Dataset (NED) database, SSURGO, LiDAR data available via state/county geospatial data clearinghouses, etc. In some aspects, the data processing module 150 may provide raw data to the topographic and imaging module 152, wherein instructions within the topographic and imaging module 152 infer the elevation of a particular plot of land by analyzing the raw data. The elevation data may be stored in a two-dimensional (2D) or three-dimensional (3D) data format, depending on the aspect and scenario.

The topographic and imaging module 152 may include instructions for determining/processing a field boundary, and for receiving/retrieving topographic data corresponding to that field boundary. The topographic data corresponding to the field boundary may be LiDAR data, as planted data (e.g., from real-time kinetic (RTK) elevation data), GPS data (including high-resolution GPS data), as applied data, or any other suitable topographic data source. The topographic and imaging module 152 may receive, via one or more processors (e.g., the processors 110), a plurality of yield data values each corresponding to a respective portion of an agricultural field. In some aspects, the respective portions may correspond to a grid of an agricultural field. For example, the grid may be a rectilinear grid or a hexagonal grid (e.g., the field may be subdivided or partitioned into a grid of a plurality of hexagonal cells).

The topographic and imaging module 152 may process the topographic data and/or image data to compute derived attributes. For example, the topographic data may include elevation data that is processed to derive slope and/or soil wetness index (SWI).

The topographic and imaging module 152 may include computer-executable instructions for generating one or more map layers and/or one or more geospatial data files (e.g., shapefiles). The topographic and imaging module 152 may store the generated map layers and/or geospatial files in an electronic database, and/or in the memory 142. The topographic and imaging module 152 may provide the geospatial files and/or map layers to other components of the environment 100, such as the client computing device 102A. Specifically, the topographic and imaging module 152 may include an API endpoint that allows another application/module (e.g., the mobile application module 118 to submit a query/request to receive/retrieve one or more geospatial files and/or one or more map layers via the network 108. Further, in some aspects, the topographic and imaging module 152 may offer one or more map layers for download by one or more user devices (e.g., the client computing device 102B).

The topographic and imaging module 152 may use existing standardized and/or proprietary software libraries to generate the maps, map layers and/or shape files. Further, the topographic and imaging module 152 may combine one or more data sets from an electronic database into a single map layer/geospatial file, or into multiple respective map layers. For example, the topographic and imaging module 152 may generate a composite geospatial data file that includes a first map layer representing a set of attributes belonging to a first field, and a second map layer representing a set of attributes belonging to a second field. The topographic and imaging module 152 may also generate multiple layers, wherein each corresponds to an underlying environmental attribute (e.g., a slope layer, an OM layer, a CEC layer, etc.). The layers may be transmitted to and caused to be displayed in user devices (e.g., the mobile computing device 102A).

For example, the multiple layers may include environmental attributes such as soil organic matter, cation-exchange capacity, relative elevation, slope, topographic attributes, precipitation patterns, solar radiation levels, evapotranspiration rates, etc. The characteristics provided as examples are a subset of the global list of underlying environmental characteristics, and the use of more characteristics is envisioned. The underlying environmental characteristics may be simple or compound. The modeling module 154 may also calculate derivatives of elevation data included in the topographic data. For example, the modeling module 154 may generate slope, SWI and catchment area, and/or other attributes to include in a spatial layer. In some aspects, the modeling module 154 may combine slope, SWI and catchment area to determine a moisture status that describes where water is moving within a geography of a field (e.g., on a hexagrid-by-hexagrid basis).

The nitrogen loss quantifying module 154 may determine one or more nitrogen loss quantifying with respect to one or more grid cells within a partitioned field. The nitrogen quantifying module 154 may receive yield data, topographic information and imagery from the topographic and imaging module 152 (e.g., topographic data corresponding to a field boundary for example) and/or derivatives of elevation, and generate one or more nitrogen loss quantification. The nitrogen loss quantifying module 154 may make an individual nitrogen loss quantification with respect to a plurality of portions (e.g., one or more hexagrids) of an agricultural field by processing respective yield, elevation and/or imagery data of each hexagrid. The nitrogen loss potential may be derived through the fusion of multiple spatial layers. The nitrogen loss potential may identify areas in the field that are prone to nitrogen loss and as a result, yield reduction.

Specifically, in some aspects, yield data and topographic data and imagery may be translated into nitrogen loss potential for a hexagrid or subfield area (e.g., each hexagrid) may be performed according to an algorithm as follows:

1. Obtain a yield dataset for a given agricultural field. Yield may be from one growing season or multiple seasons preferably.
2. For each growing season (t) in the yield dataset, calibrate the yield data to a suitable distribution model (e.g., Weibull, mixture of normals, non-parametric kernel, etc.) and calculate expected yield value $E(YLD_t)$
3. Environmentally match all subfield (e.g., hexagrid) cells that have soil wetness index (SWI) values greater than $SWI_{thresh}$. For example, $SWI_{thresh}$ may be 8. In some aspects, $SWI_{thresh}$ may be a dynamic value based on field characteristics. In some aspects, the environmental matching techniques of U.S. Pat. No. 11,348,696—the entirety of which is hereby incorporated by reference for all purposes—may be used in this process to perform environmental matching of the subfield cells.
4. Calculate respective initial nitrogen loss for each grid cell and growing season ($iNL_{i,t}$) using the following $iNL_{i,t} =$ $$\begin{cases} 0 & \text{IF } SWI_i < SWI_{thresh} \\ (YLD_{i,t} - E(YLD_t))/(SWI_i \times (SWI_i - SWI_{thresh})) & \text{IF } SWI_i \geq SWI_{thresh} \end{cases}$$

Where:
$iNL_{i,t}$ is the initial nitrogen loss value for grid cell i in growing season t
$YLD_{i,t}$ is the observed yield in grid cell i from growing season t
$SWI_i$ is the soil wetness index for grid cell i 5. Constrain $iNL_{i,t}$ to be greater than or equal to −4.0 and less than or equal to 7.0
6. Rescale $iNL_{i,t}$ to a 0-20 range using:

$sNL_{i,t} = (iNL_{i,t} - \min(iNL_t))/(\max(iNL_t) - \min(iNL_t))$

Where:
$sNL_{i,t}$ is the scaled nitrogen loss values for grid cell i in season t 7. Determine the maximum $sNL_{i,t}$ for each grid cell from all years of computed Nitrogen Loss (i.e., $pNL_i = \max(sNL)$; where $pNL_i$ is the Nitrogen Loss Potential for grid cell i).
8. Apply a nearest neighbor smoothing algorithm to the values $pNL_i$ and save the values to a database.

In some aspects, vegetation indices (e.g., NDVI, GNDVI, SAVI, $NDVI_{RE}$) extracted from remotely sensed imagery (e.g., aerial, satellite, etc.) may be used instead of $YLD_{i,t}$ provided those images are not obscured by excessive cloud cover and are collected at a representative time.

The prescription generation module 156 may include one or more sets of computer-executable instructions for generating digital agricultural prescriptions. For example, the prescription generation module 156 may include instructions for generating a FieldScript or Field 360 prescription based on the yield data and nitrogen loss spatial map layer including the nitrogen loss index values corresponding to the subdivisions of the agricultural field. In some aspects, more/different prescription technologies may be used, for example, Case IH AFS Pro 700, Case IH AFS Pro 1200, John Deere GreenStar 4600, Precision Planting 20/20, Raven Viper and others, including other versions of any of the foregoing. A generic shapefile may also be exported and utilized with the above-described techniques. The prescription generation module 156 may provide the prescription to another module (e.g., the web application module 158) and/or store the digital prescription (e.g., in the electronic database 180).

The web application module 158 may serve one or more web applications or web sites that provide access to the proprietor of the computing environment 100 (e.g., the agrilytics company) and/or one or more agronomists, customers, field managers, growers, etc. The web application module 158 may include one or more sets of computer-executable instructions that enable the user of the web application to input information (e.g., yield data, field boundaries in the form of a shapefile, imagery, one or more field identifiers, etc.). The web application module 158 may include one or more sets of computer-executable instructions that enable the user of the web application to select from one or more predetermined products (e.g., a nitrogen stabilizer such as Instinct II, N-Serve, Centuro, etc.). The web application 158 may include instructions for retrieving one or more concentrations and/or active ingredients descriptions from the database 180 corresponding to the selected predetermined product(s).

The web application module 158 may display an electronic form including an element that the user may access (e.g., via a mouse click via the client computing device 102B) to cause the input information and/or selected predetermined products to be processed. For example, the web application module 158 may include instructions for passing the submitted electronic form to the topographic and imaging module 152 and/or the nitrogen loss quantifying module 154 to obtain, respectively, and for each of one or more identified agricultural fields, a nitrogen loss spatial map layer including a nitrogen loss index value corresponding to each respective portion of the fields and/or a digital agricultural prescription including a respective prescription value of the selected nitrogen protectant product for each respective portion of each of the fields (e.g., each hexagrid of the agricultural field).

The web application module 158 may enable the user to download the obtained nitrogen loss spatial map layer and/or digital agricultural prescription to a client computing device for display, execution and/or further analysis. In some aspects, the web application module 158 may transmit the digital agricultural prescription to an implement (e.g., the implement 104) for execution by the implement 104 on the agricultural field. In some aspects, the web application module 158 may display the nitrogen loss spatial map for viewing by the user of the client computing device 102B.

In some aspects, machine learning models/algorithms may be trained and operated to carry out the operations of the modules stored in the memory 142. For example, aspects may use supervised and unsupervised machine learning techniques, including classification, regression, clustering, dimensionality reduction (e.g., autoencoding), support vector machines, Bayesian networks, and/or neural networks (e.g., deep artificial neural networks, convolutional neural networks, etc.). In some aspects, machine learning may be used to quantify nitrogen loss values, application rates and/or to quantify whether changes in the canopy of the agricultural field are due to drought, excessive precipitation or other conditions.

In some aspects, the modules 150-158 may be executed in parallel by the processors 140, such that derivatives of elevation, nitrogen loss quantifications, and application rate computations are calculated in parallel, thereby greatly speeding up computations.

The remote computing device 106 may further include one or more database 180, an input device 182, and an output device 184. The database 180 may be implemented as a relational database management system (RDBMS) in some aspects. For example, the database 180 may include one or more structured query language (SQL) database, a NoSQL database, a flat file storage system, or any other suitable data storage system/configuration. In general, the database 180 allows the client computing device 102A and/or the remote computing device 106 to create, retrieve, update, and/or retrieve records relating to performance of the techniques herein. For example, the database 180 may allow the client computing device 102A to store information received from one or more sensors of the implement 104 and/or the attachments 140.

The database 180 may store information received from users, via the input device 122 of the client computing device 102A and/or via the input device 182 of the remote computing device 106. The database 180 may be configured for the storage and retrieval of spatial data, in some aspects. The client computing device 102A may include a module (not depicted) including a set of instructions for querying an RDBMS, spatial data, etc. For example, the client computing device 102A may include a set of database drivers for accessing the database 180 of the remote computing device 106. In some aspects, the database 180 may be located remotely from the remote computing device 104, in which case the remote computing device 104 may access the database 180 via the NIC 112 and the network 106.

The input device 182 may include any suitable device or devices for receiving input, such as one or more microphone, one or more camera, a hardware keyboard, a hardware mouse, a capacitive touch screen, etc. The input device 182 may allow a user (e.g., a system administrator) to enter commands and/or input into the remote computing device 106, and to view the result of any such commands/input in the output device 184.

The output device 184 may include any suitable device for conveying output, such as a hardware speaker, a computer monitor, a touch screen, etc. The remote computing device 106 may be associated with (e.g., leased, owned, and/or operated by) an agrilytics company. As noted above, the remote computing device 106 may be implemented using one or more virtualization and/or cloud computing services. One or more application programming interfaces (APIs) may be accessible by the remote computing device 106.

Exemplary Yield Response and Nitrogen Loss Potential

Figure 2A:
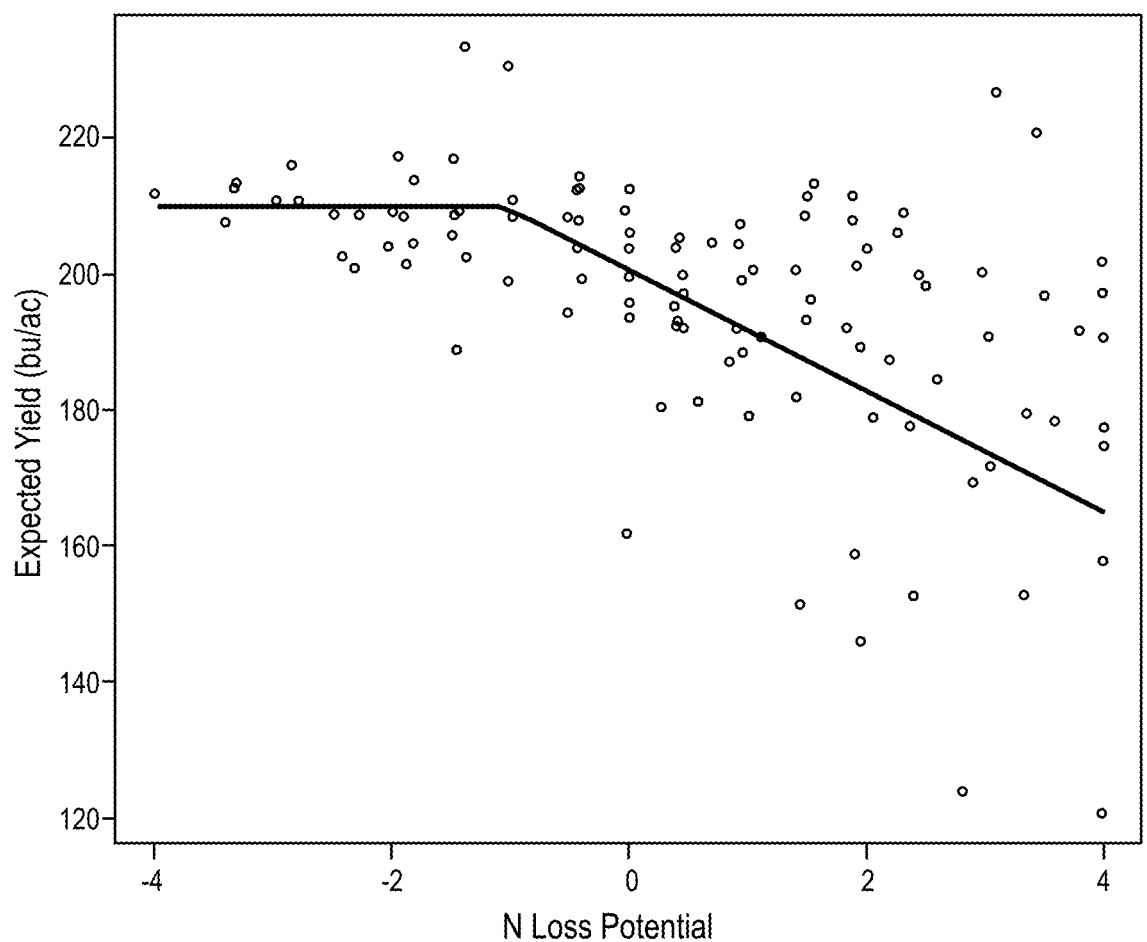
FIG. 2A depicts an example chart of expected yield and nitrogen loss potential, according to some aspects.

FIG. 2A depicts an example chart 200 of expected yield and nitrogen loss potential, according to some aspects. In particular, the chart 200 demonstrates that as nitrogen loss potential increases (X axis), the expected yield decreases and becomes more diffuse. Thus, the chart 200 demonstrates that there is a strong interest in growers in reducing nitrogen loss potential, to not only maintain yields and to do so in a predictable manner, but also improve nitrogen use efficiency.

Figure 2B:
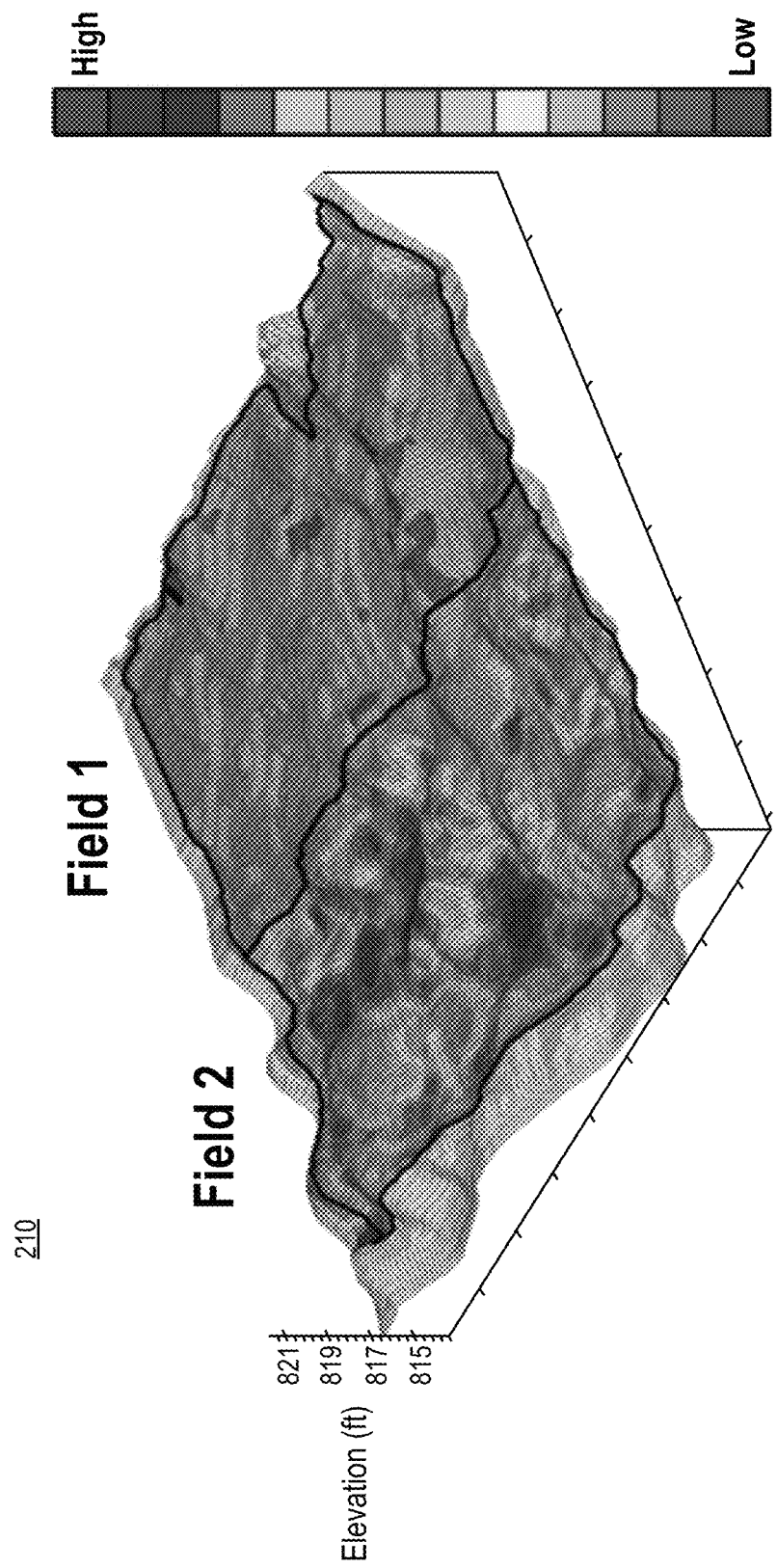
FIG. 2B depicts an example spatial map showing field-specific variability and causes thereof, according to some aspects.
Figure 2C:
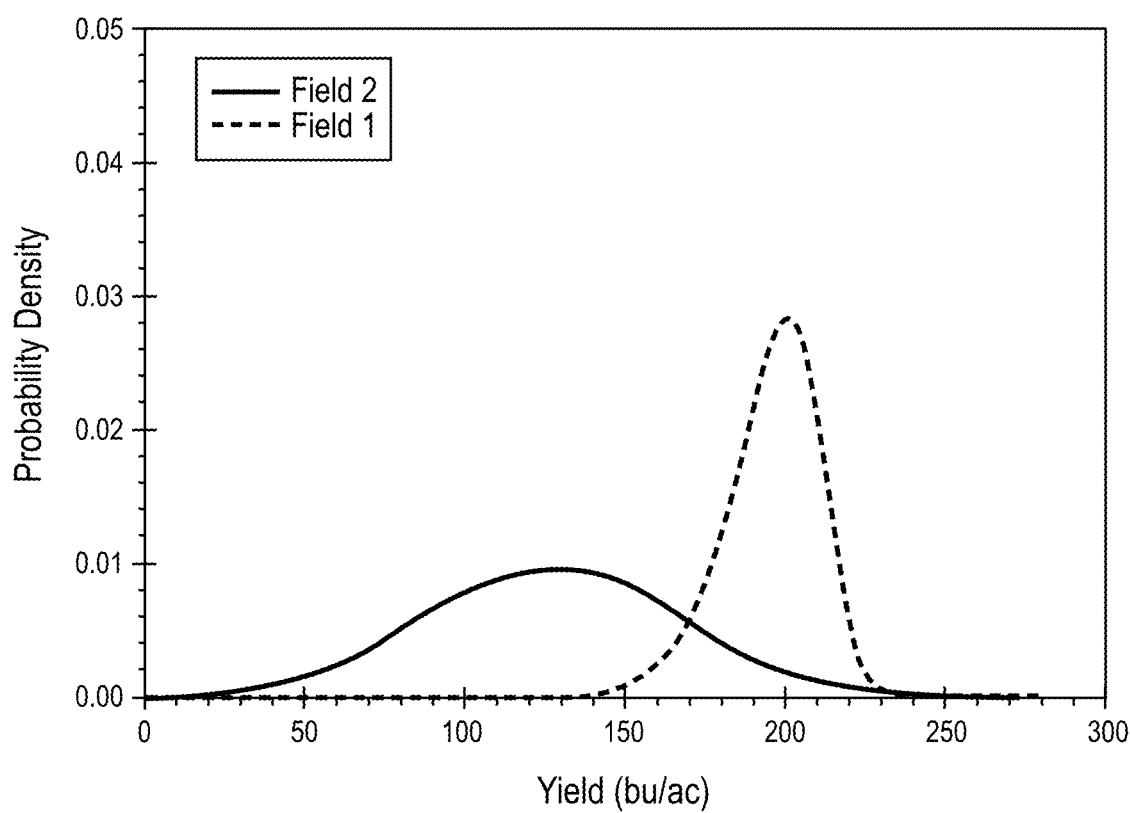
FIG. 2C depicts a probability density chart corresponding to the spatial map of FIG. 2B, according to some aspects.
Figure 2D:
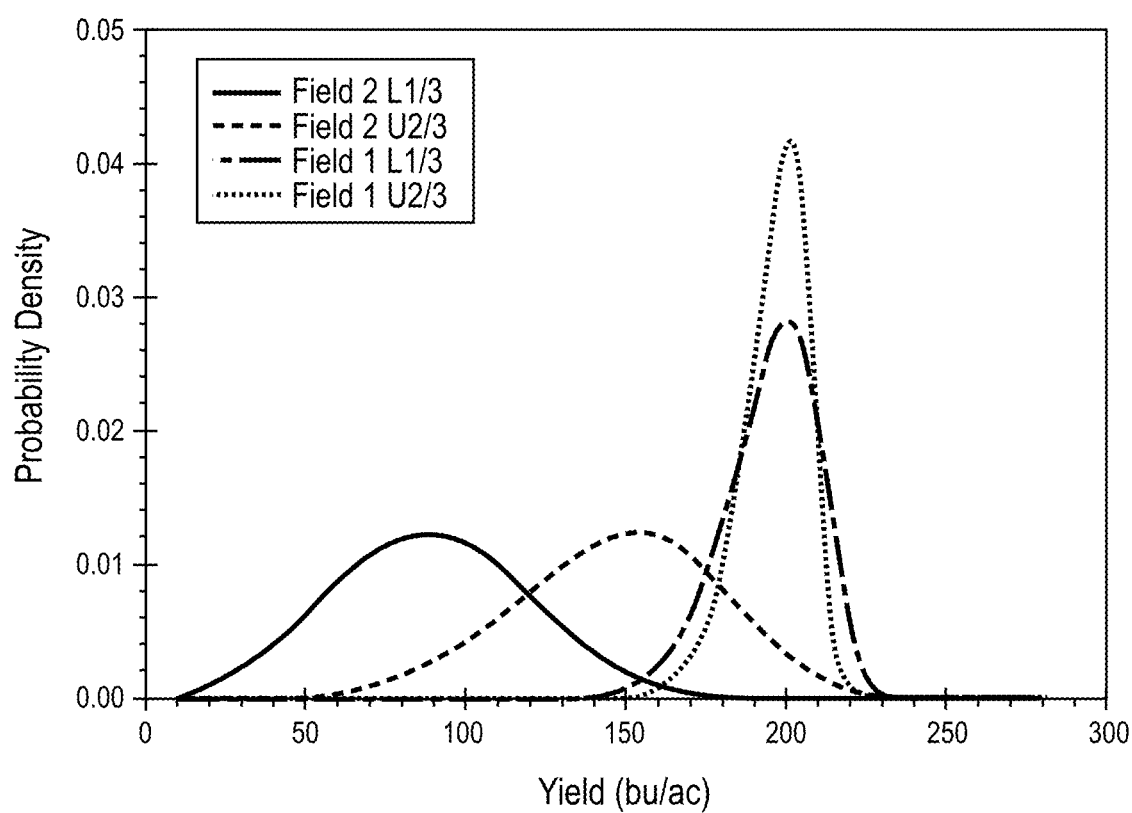
FIG. 2D depicts a probability density chart corresponding to the spatial map of FIG. 2B, according to some aspects.

FIG. 2B depicts an example spatial map 210 showing field-specific variability and causes thereof, according to some aspects. In particular, the spatial map 210 depicts a first field and a second field that is directly adjacent to (i.e., bordering) the first field. The first field may include several portions (e.g., hexagrids) of noticeably higher yield, whereas the second field includes several portions of noticeably lower yield. FIG. 2C depicts a probability density chart 220 corresponding to the spatial map 210 of FIG. 2B, according to some aspects. FIG. 2D depicts a probability density chart 230 corresponding to the spatial map 210 of FIG. 2B, according to some aspects. Factors affecting probability of a successful yield in field 1 and field 2 include variable rate seeding, placement of varieties/hybrids, and nitrogen use efficiency.

Exemplary Nitrogen Loss Potential Spatial Maps

Figure 2E:
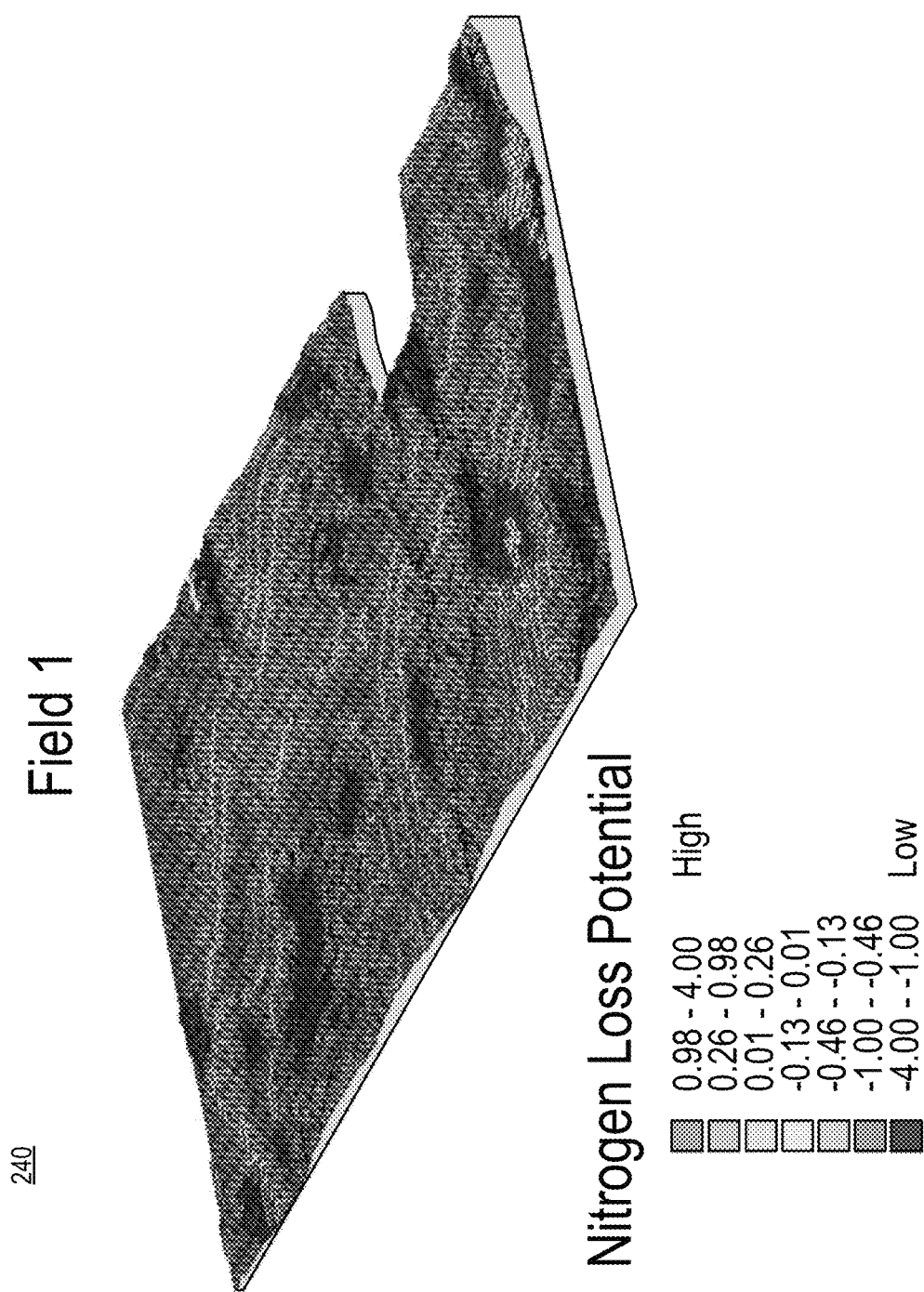
FIG. 2E depicts an exemplary nitrogen loss potential map corresponding to field 1 of FIG. 2B, according to some aspects.
Figure 2F:
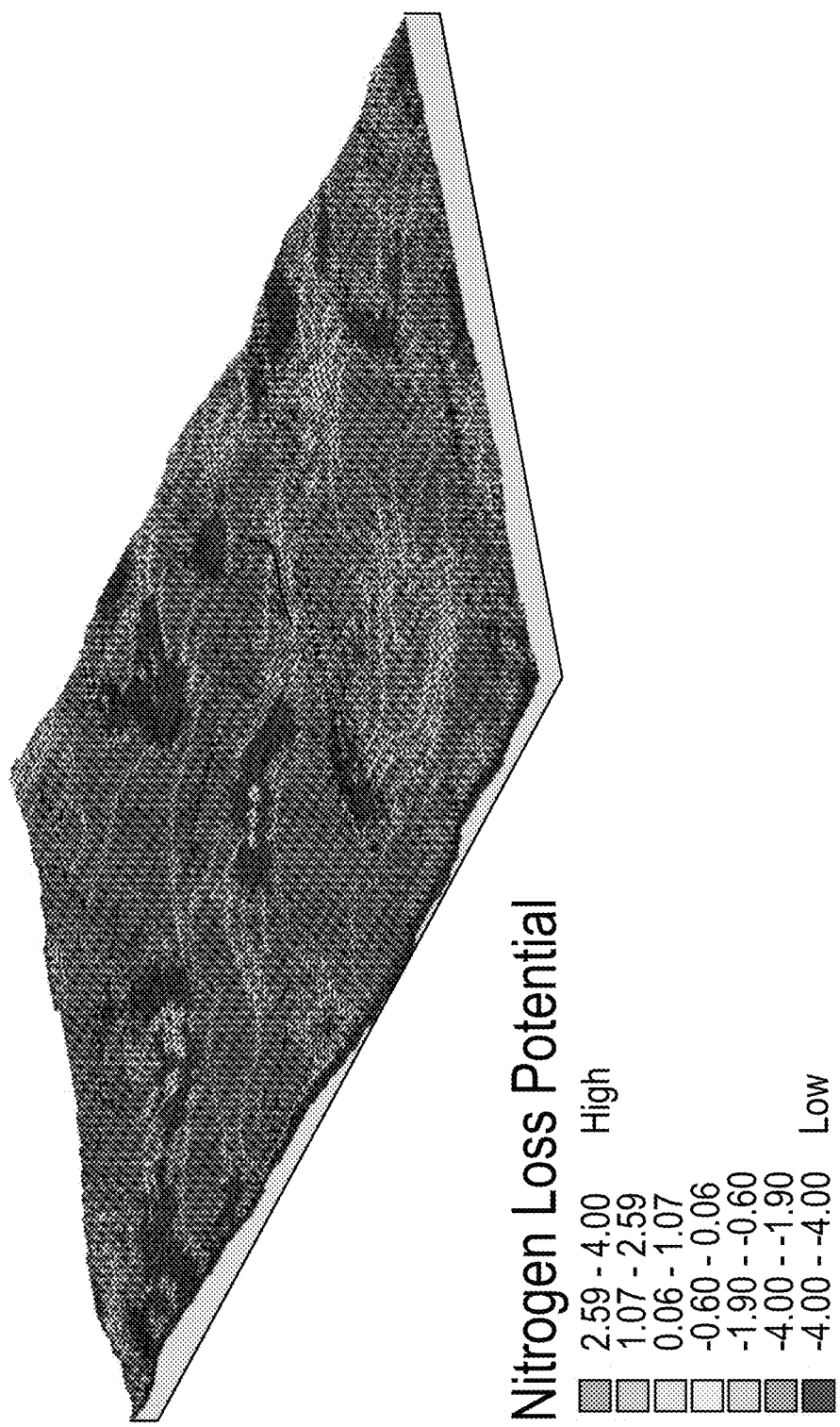
FIG. 2F depicts an exemplary nitrogen loss potential map corresponding to field 2 of FIG. 2B, according to some aspects.

FIG. 2E depicts an exemplary nitrogen loss potential map 240 corresponding to field 1 of FIG. 2B, according to some aspects. FIG. 2F depicts an exemplary nitrogen loss potential map 250 corresponding to field 2 of FIG. 2B, according to some aspects. In some aspects, the nitrogen loss quantifying module 154 of FIG. 1 may generate the map 240 and the map 250. Each respective grid cell of the map 240 and the map 250 may include a respective nitrogen loss potential index value as shown in the range of −4.00 to +4.00. In some aspects, the index values may be scaled to larger values (e.g., in the range of 0.00 . . . 20.00, inclusive). An appropriate range may be experimentally determined, in some aspects.

It should be appreciated that the map 240 and the map 250 may be displayed to a user (e.g., to a user of the client computing device 102B), thereby advantageously enabling the user to gain an immediate and intuitive grasp of the nitrogen loss potential of the field at a highly granular level (e.g., via 8.5-m diameter or smaller hexagrids, in some aspects). As discussed, the web application 158 may display the map 240 and/or the map 250, for example. The web application 158 may also transmit the maps as shape files and/or allow them to be accessed/downloaded by the user device.

Figure 3A:
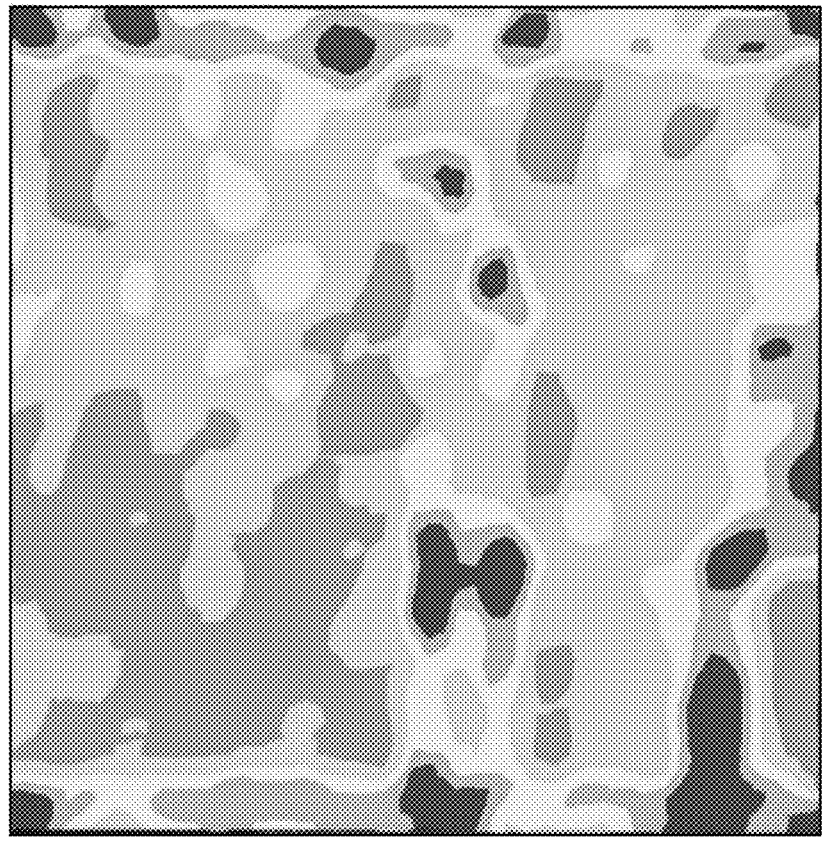
FIG. 3A depicts an exemplary yield map corresponding to an agricultural field in a first year, according to some aspects.

FIG. 3A depicts an exemplary yield map 300 corresponding to an agricultural field in a first year, according to some aspects.

For example, the yield map 300 may correspond to a field of a grower in Central Illinois.

Figure 3B:
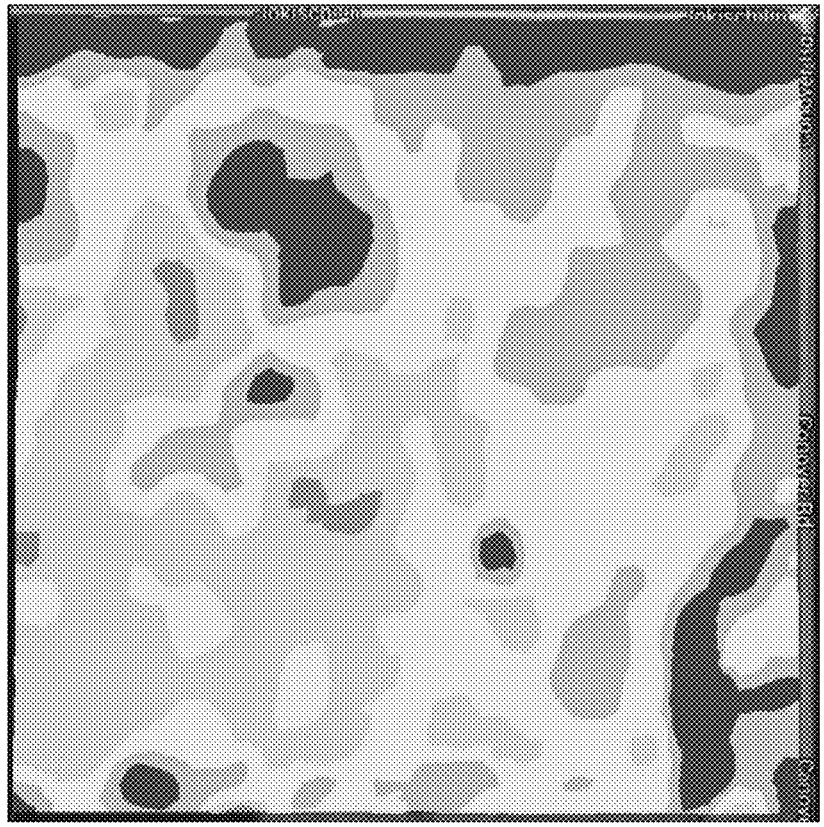
FIG. 3B depicts an exemplary yield map corresponding to the agricultural field of FIG. 3A in a second year, according to some aspects.

FIG. 3B depicts an exemplary yield map 310 corresponding to the agricultural field of FIG. 3A in a second year, according to some aspects. FIG. 3A and FIG. 3B demonstrate that there is significant spatial variability in yield over time. The two maps depict very different yields and growing seasons. The growing conditions in 2014 were ideal, involving timely rain, no excess rain, no excess heat, which resulted in very high yields. The growing conditions for the field in 2015 were miserable due to excessive rains early in the growing season, causing increased nitrogen loss due to denitrification, and overall reduced yield for that year.

Figure 3C:
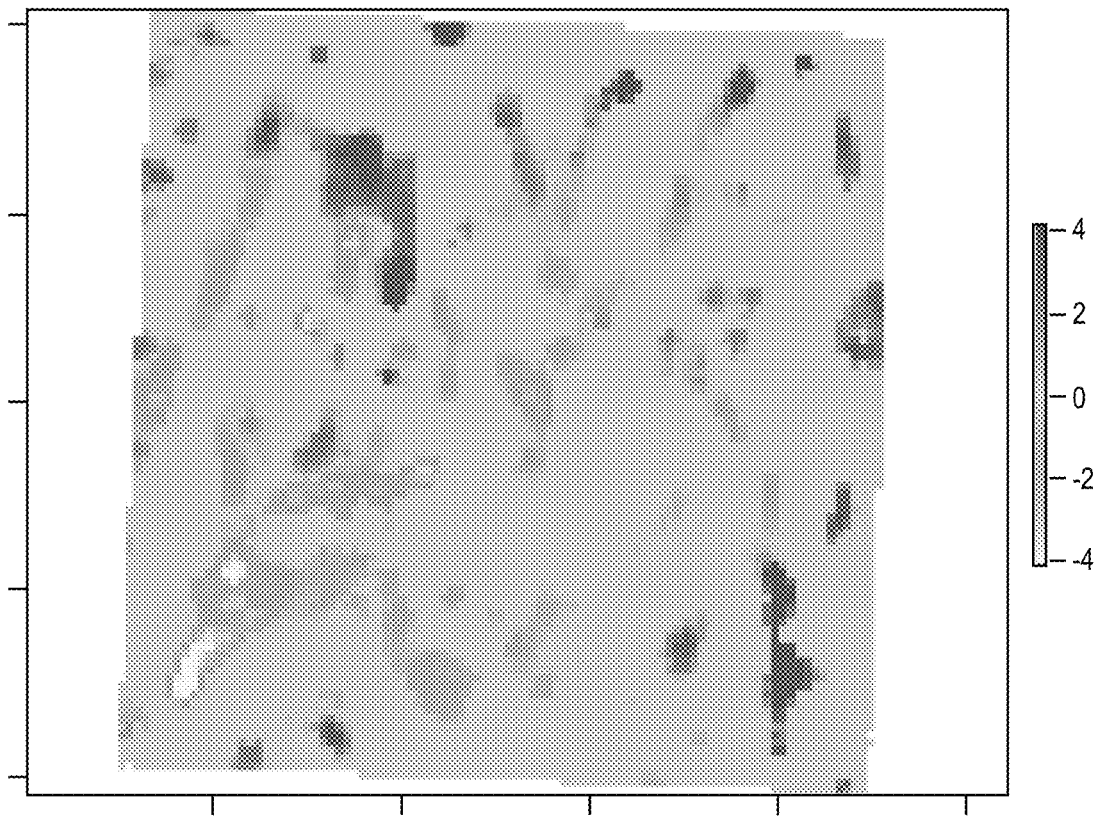
FIG. 3C depicts an exemplary nitrogen loss potential map corresponding to the agricultural field of FIG. 3A in the first year, according to some aspects.

However, the temporal variability of nitrogen loss potential between the two years was small, as depicted in FIG. 3C. Spatial performance of nitrogen loss potential with 2014 yield (223 bushels/acre) was very similar to 2015 yield (203 bushels/acre) while spatial patterns of yield were dissimilar. The data from the maps 300 and 310 may be provided to the nitrogen loss quantifying module 154, and used to quantify nitrogen loss.

Figure 3D:
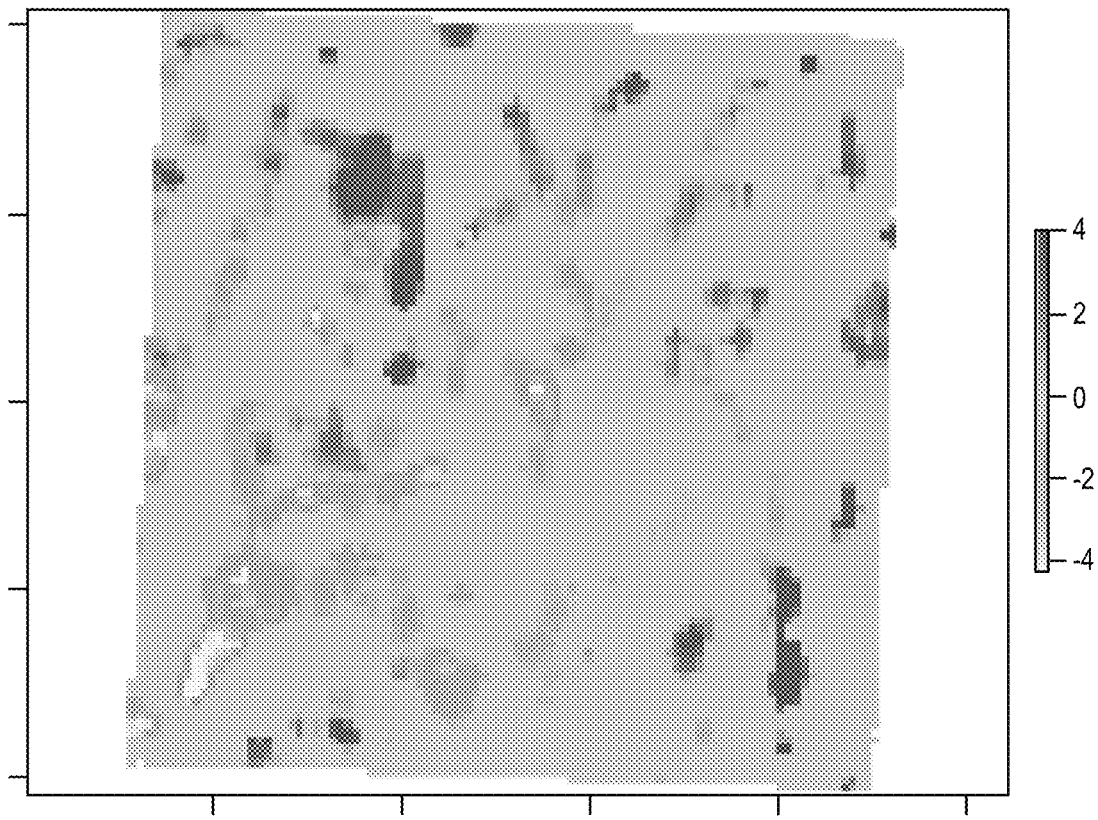
FIG. 3D depicts an exemplary nitrogen loss potential map corresponding to the agricultural field of FIGS. 3B (and 3A) in the second year, according to some aspects.

FIG. 3C depicts an exemplary nitrogen loss potential map 320 corresponding to the agricultural field of FIG. 3A in the first year, according to some aspects. FIG. 3D depicts an exemplary nitrogen loss potential map 330 corresponding to the agricultural field of FIGS. 3B (and 3A) in the second year, according to some aspects.

FIGS. 3C and 3D demonstrate that while large spatial variability of yield occurred between 2014 and 2015, the differences in nitrogen loss potential was small/minimal. The quantification of nitrogen loss potential created from the data from FIG. 3A and FIG. 3B is very useful because the nitrogen loss potential quantifications enable the grower or other interested party to identify the areas most at risk regardless of year of data utilized. Therefore, the present techniques are very robust from the standpoint of being able to identify areas prone to loss based on minimally variable nitrogen loss information and highly variable yield information. Regardless of year of data utilized, the present techniques are able to distinguish areas at risk for nitrogen loss.

Exemplary Prescription Shapefile

Figure 3E:
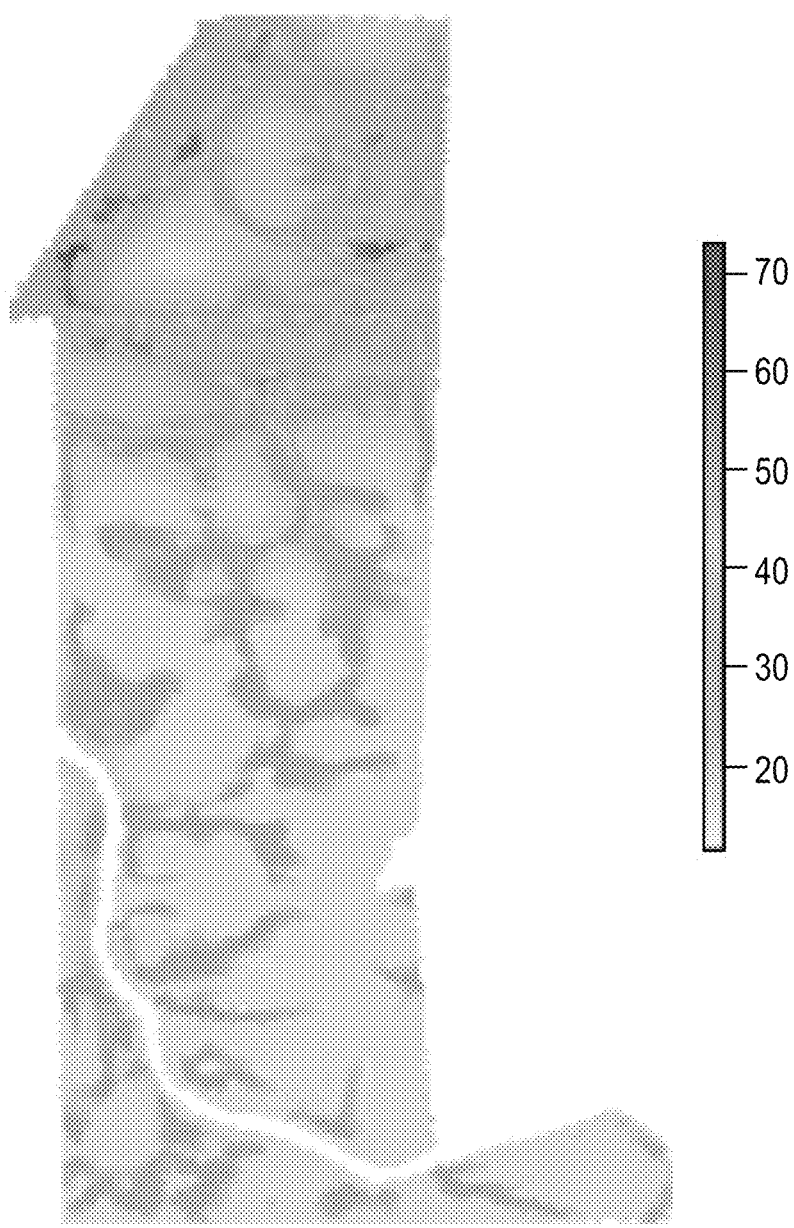
FIG. 3E depicts an exemplary shapefile visualization according to some aspects.

FIG. 3E depicts an exemplary shapefile visualization 340 according to some aspects. The visualization may correspond to an electronic prescription generated by the prescription generation module 156 that, when executed by an implement (e.g., the implement 104), causes the implement 104 to dispense product variably within the agricultural field.

Exemplary Confirmatory Field Trials

The present techniques were tested empirically using a number of nitrogen stabilizing products. As discussed, the present techniques enable the user of the remote computing device 106 to select one or more predetermined products. Any suitable products may be chosen for deployment using the present techniques. Any suitable crops may be quantified and the nitrogen loss of those crops mitigated using the present techniques, including corn, wheat and others.

A first trial conducted involved Instinct/N-Serve products (Corteva AgroSciences). The trial design included three treatments, having 0.0 gallons/acre (control) 0.25 gallons/acre, and 0.5 gallons/acre. Nitrogen was applied pre-planting, and there were a minimum of three repetitions per field. The treatments encompassed the entire length of the field to capture multiple growing environments. Approximately 41,000 observations were collected.

As shown in Table 1, depending on the environmental attributes of the field, the addition of product significantly influenced yield. For example, the addition of 74 oz of Instinct positively influenced yield 6.8 bushels/acre over the control in the environments of greatest nitrogen loss risk, but negatively influenced yield 6.1 bushels in the areas of low risk. Addition of 37 oz of Instinct positively influenced yield (4.8 bushels/acre) over the control only in the Mid-High environments in the field. No significant difference was found in the highest or lowest risk environments.

TABLE 1

| N Loss Group | Comparison | Difference, bu./acre | T Ratio | Pr > t |
| --- | --- | --- | --- | --- |
| High | 74-0 | 6.8 | 4.52 | <0.0001 |
| High | 74-37 | 4.4 | 3.30 | 0.0028 |
| Low | 74-37 | −3.3 | −2.55 | 0.0293 |
| Mid-High | 37-0 | 4.8 | 4.74 | <0.0001 |
| Mid-High | 74-0 | 6.1 | 5.08 | <0.0001 |

Figure 4A:
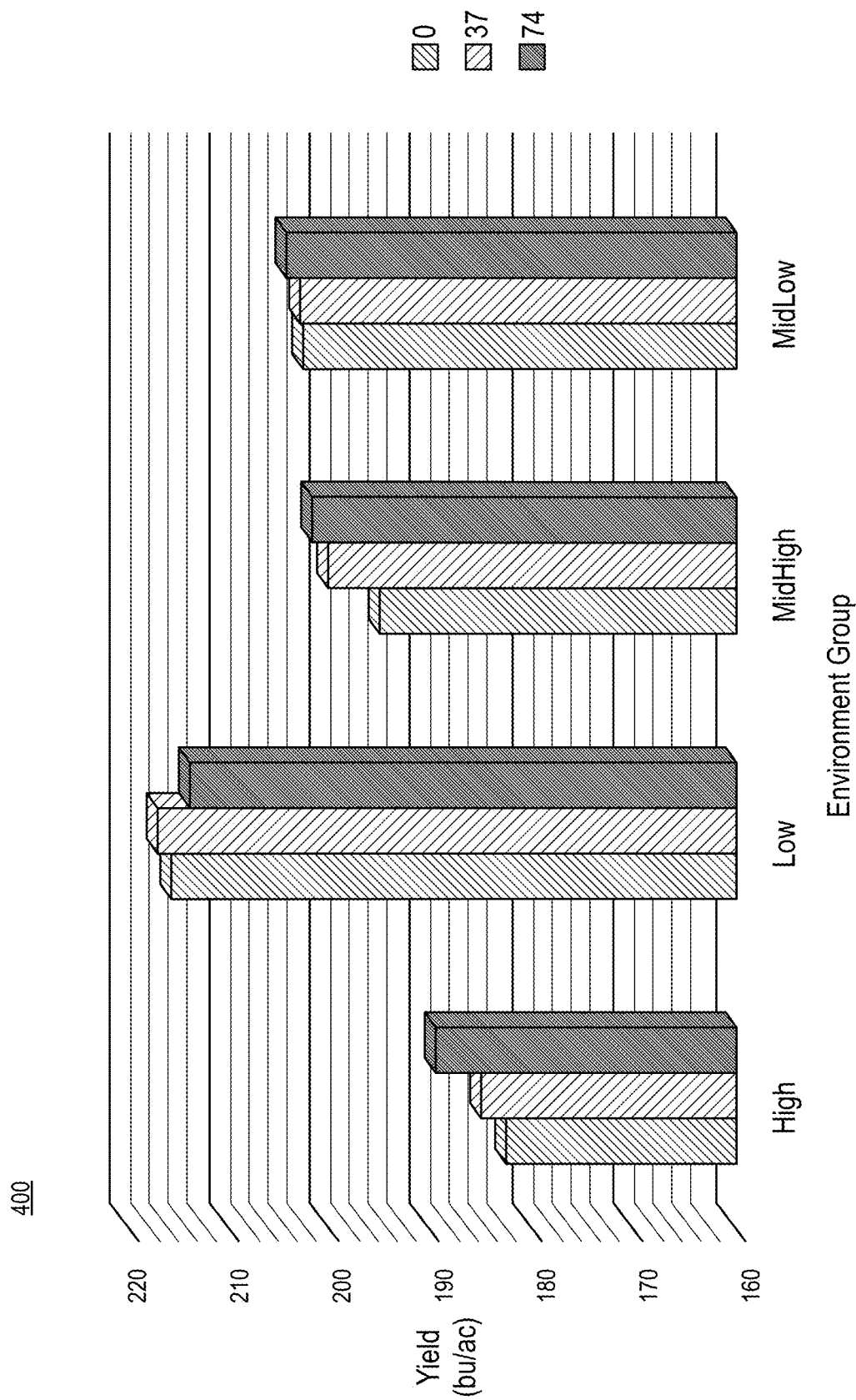
FIG. 4A depicts an example bar chart showing response of Instinct rate as influenced by nitrogen loss potential, according to some aspects.

FIG. 4A depicts an example bar chart 400 showing response of Instinct rate as influenced by nitrogen loss potential, according to some aspects. Addition of 74 oz of Instinct increased yield over the control and 37 oz rate in three of the four loss environment categories, but decreased yield in the lowest NLP environment. Addition of 37 oz of Instinct on average positively influenced yield as compared to the control in each of the environments, but in only one environment was a significant response found.

FIG. 4B depicts an example line chart 410 showing response of Instinct rates by field environment, according to some aspects. In areas prone to nitrogen loss, higher rates of instinct provided a significant yield advantage over untreated areas. Higher rates of Instinct provided no yield benefit to areas not susceptible to nitrogen loss.

As shown in Table 2, the influence of N-Serve on yield was also highly dependent on environmental variables. Specifically, results with N-Serve slightly differed from the Instinct results as grouped by Nitrogen Loss Group. Increased yield was found with addition of the 2× rate over the control and 1× rate in the high Nitrogen Loss group. Decreased yield was observed with addition of the 2× rate over the 1× rate in the Low Nitrogen Loss group. In the Mid-High Nitrogen Loss group, yield was decreased with N-Serve addition, contrary to what was observed with Instinct addition. In areas of high risk of Nitrogen loss, addition of 0.5 gallons of N-Serve per acre increased yield over the control and the 0.25 gallons of N-Serve per acre 18.4 and 8.3 bushels, respectively. Addition of 0.5 gallons of N-Serve per acre decreased yield 3.0 bushels per acre compared to the 0.25 gallon rate in the Low Nitrogen Loss group, but the 0.25 gallon rate increased yield over the control 3.8 bushels per acre in the same environment.

TABLE 2

| N Loss Group | Comparison | Difference bu/ac | T Ratio | Pr > t |
|---|---|---|---|---|
| High | 0.5-0.25 | 8.3 | 4.51 | <0.0001 |
| High | 0.5-0 | 18.4 | 2.78 | 0.0015 |
| Low | 0.5-0.25 | −3.0 | −3.46 | 0.0016 |
| Low | 0.25-0 | 3.8 | 2.461 | 0.0369 |
| MidHigh | 0.5-0.25 | −1.2 | 2.502 | 0.0331 |
| MidHigh | 0.25-0 | −4.0 | −4.38 | <0.0001 |
| MidHigh | 0.5-0 | −5.1 | −5.699 | <0.0001 |
| MidLow | 0.25-0 | −3.2 | −5.59 | <0.0001 |
| MidLow | 0.5-0 | −2.8 | −4.85 | <0.0001 |

Figure 4C:
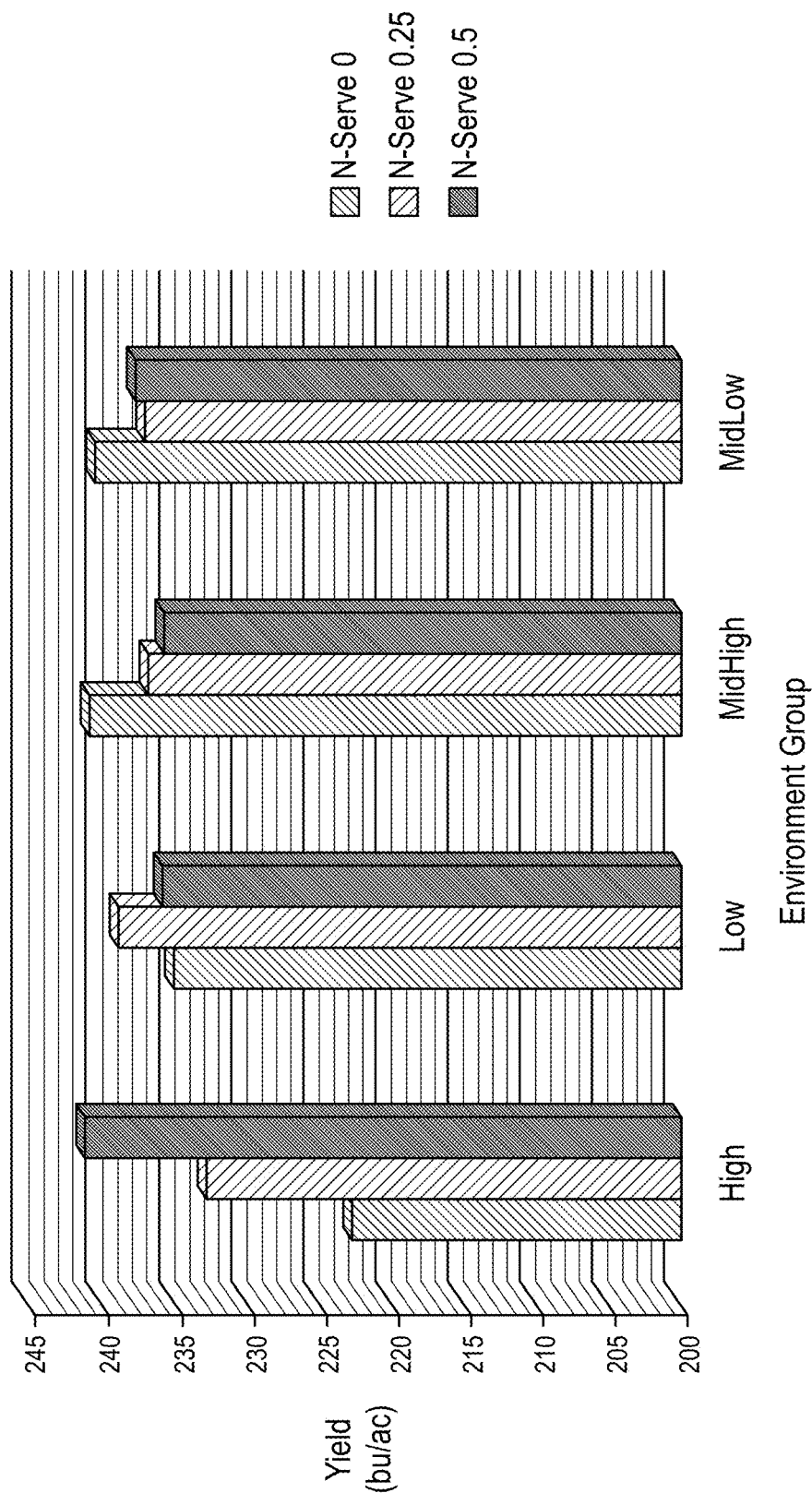
FIG. 4C depicts an example bar chart showing response of N-Serve rate as influenced by nitrogen loss potential, according to some aspects.

FIG. 4C depicts an example bar chart 420 showing response of N-Serve rate as influenced by nitrogen loss potential, according to some aspects. In the High Nitrogen Loss environment, addition of 0.25 and 0.5 gallons of N-Serve per acre significantly increased yield. In the MidHigh and MidLow Nitrogen Loss environment, increased yield over all N-Serve rates was observed. In the Low Nitrogen Loss sub field areas, addition of 0.25 gallons of N-Serve per acre increased yield over the control and gal rate.

Figure 5A:
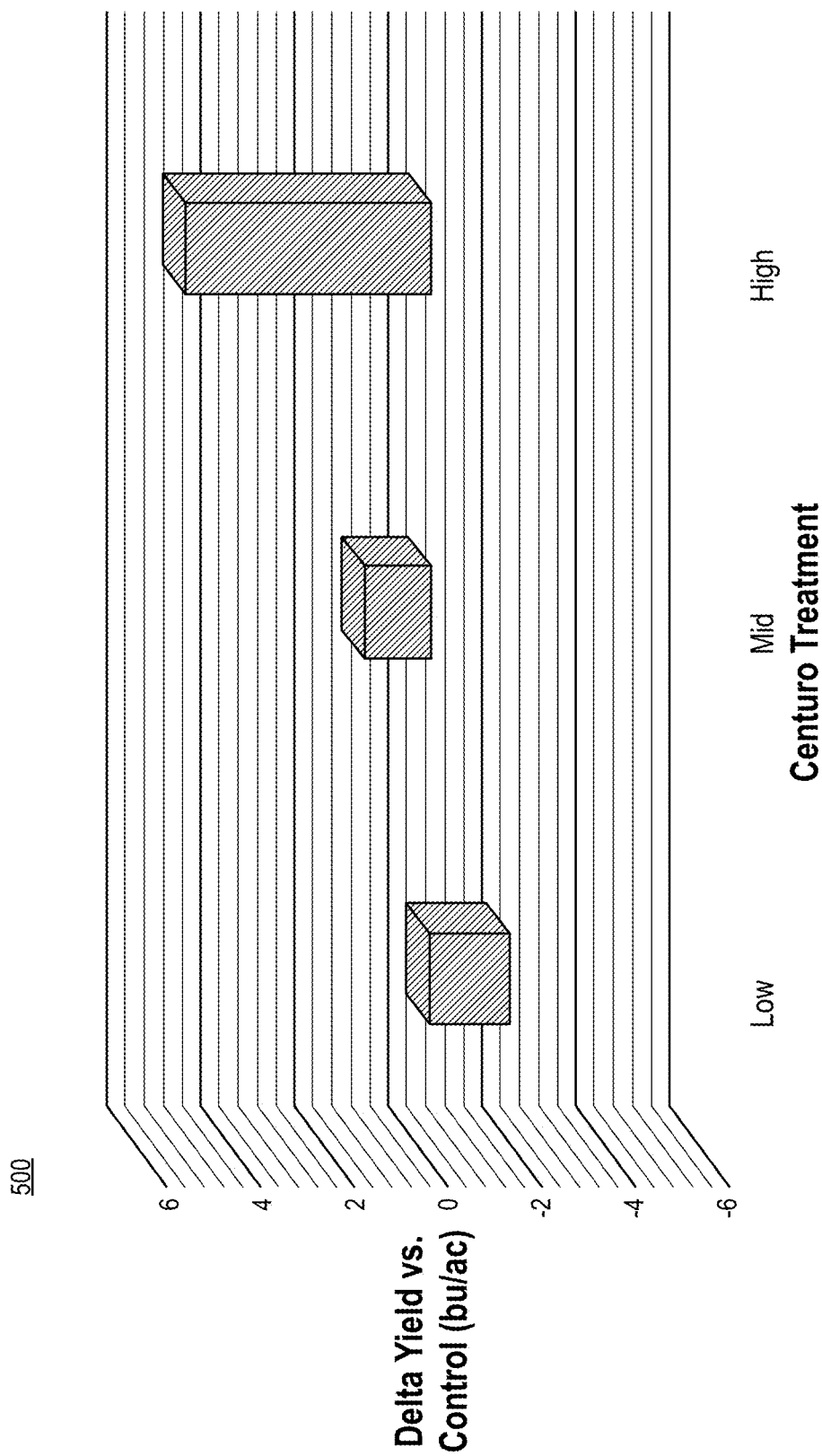
FIG. 5A depicts an example bar chart depicting overall yield results, according to some aspects.
Figure 5B:
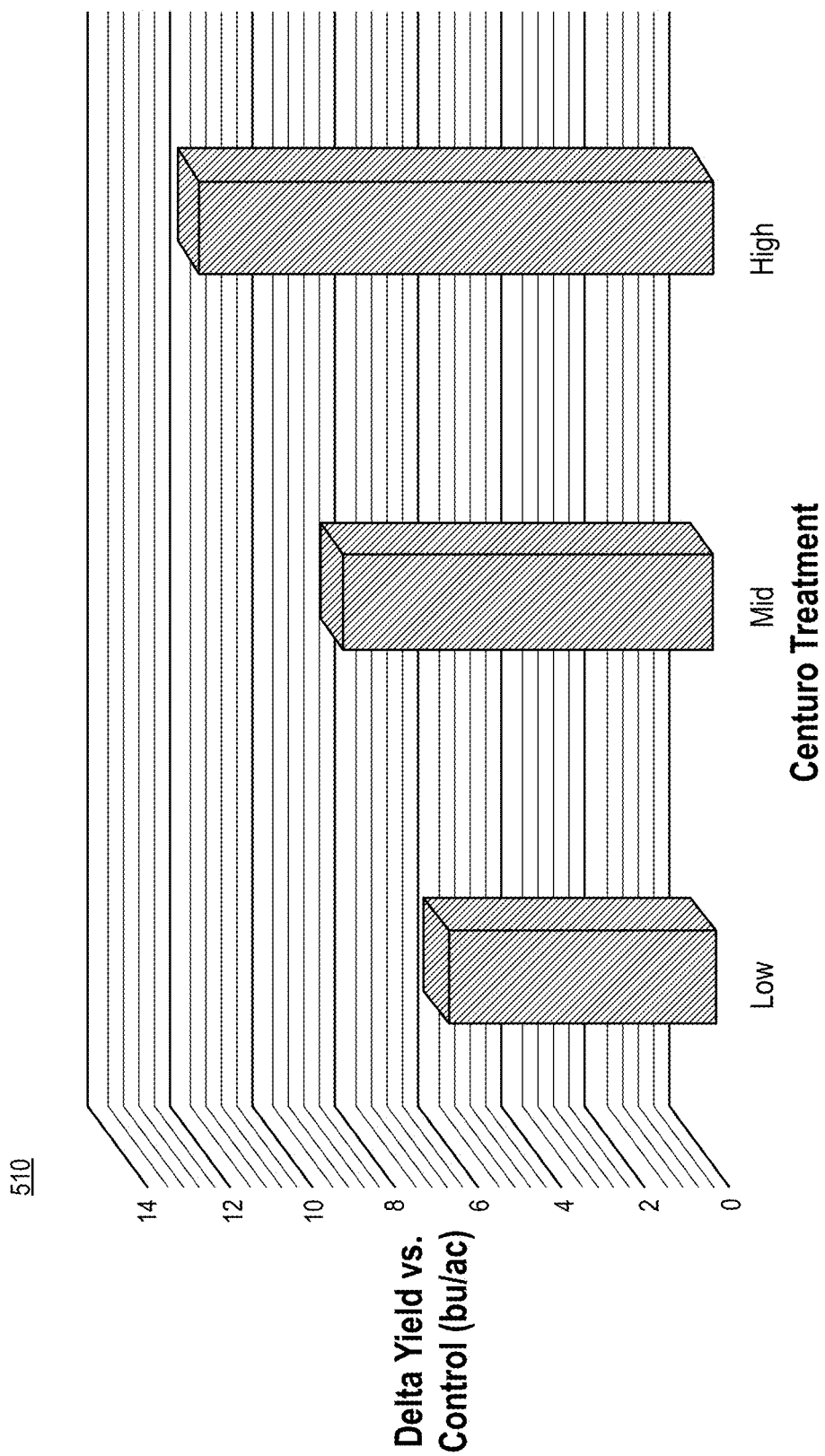
FIG. 5B depicts an example bar chart depicting overall yield results with a soil wetness index of greater than or equal to 9.0, according to some aspects.

A second trial involved Centuro (Koch Agronomic Services). Nitrogen Protectant trials were established on three fields in Illinois during the growing season using Centuro. Analysis was conducted to determine the yield differences between untreated areas and three Centuro rates. The overall results, are summarized in FIG. and results having an SWI of 9 or higher are summarized in FIG. 5B. Additional analyses were conducted to validate the spatial efficacy of the present nitrogen protectant recommendations/prescriptions. FIG. 5A depicts an example bar chart 500 depicting overall yield results for the Centuro trial, according to some aspects. FIG. 5B depicts an example bar chart 510 depicting overall yield results with a soil wetness index of greater than or equal to 9.0, according to some aspects.

Exemplary Results

The above-described trial analyses demonstrated the ability of additional nitrogen protectant to mitigate nitrogen loss. The present quantifying nitrogen protectant recommendations/prescriptions and associated nitrogen loss modeling enable the present techniques to spatially-differentiate and manage nitrogen loss by integrating the key factors that contribute to nitrogen loss and providing a mechanism to mitigate those factors.

Figure 5C:
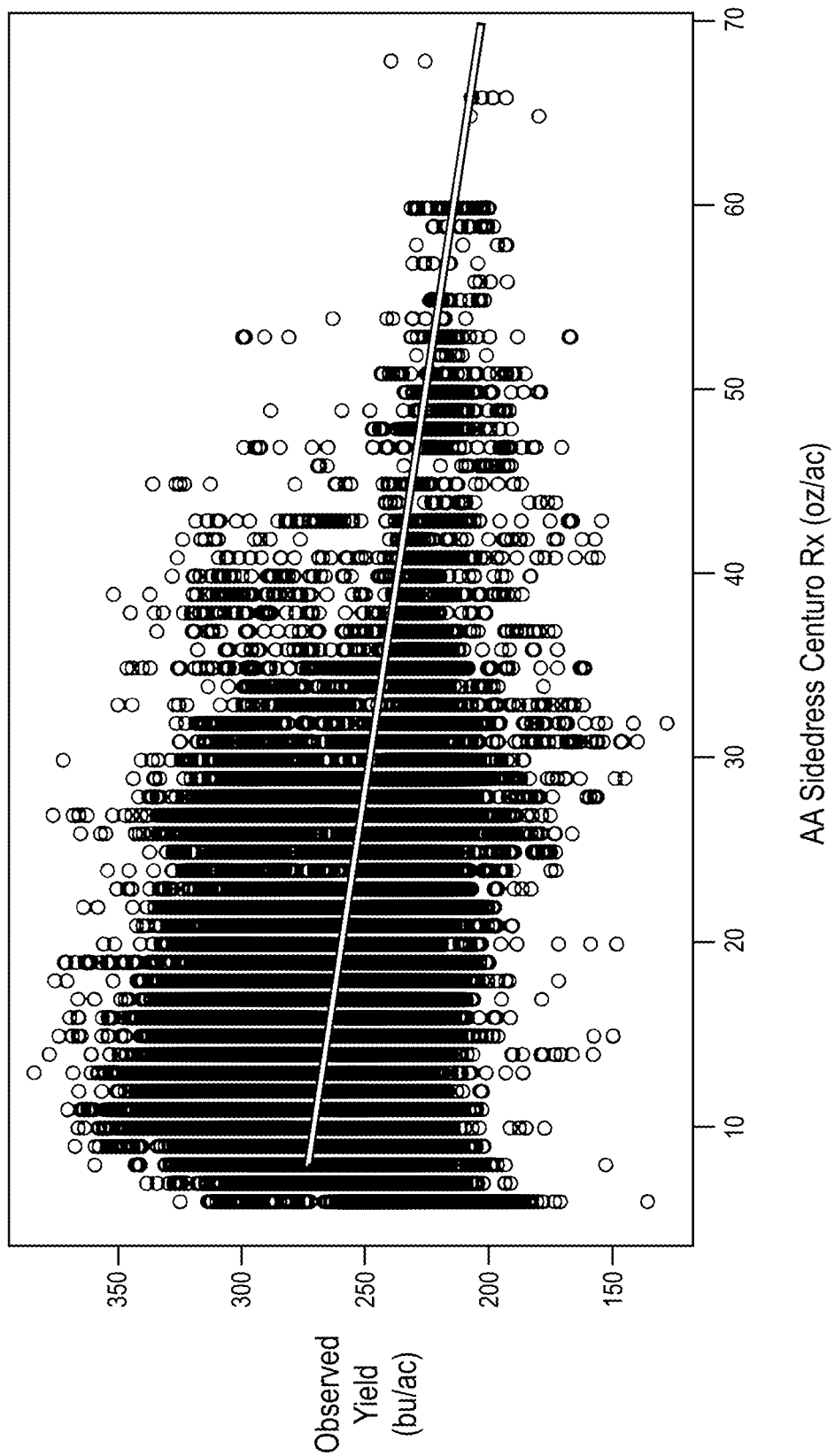
FIG. 5C depicts an example scatterplot depicting yield as a function of nitrogen inhibitor product volume, according to some aspects.
Figure 5D:
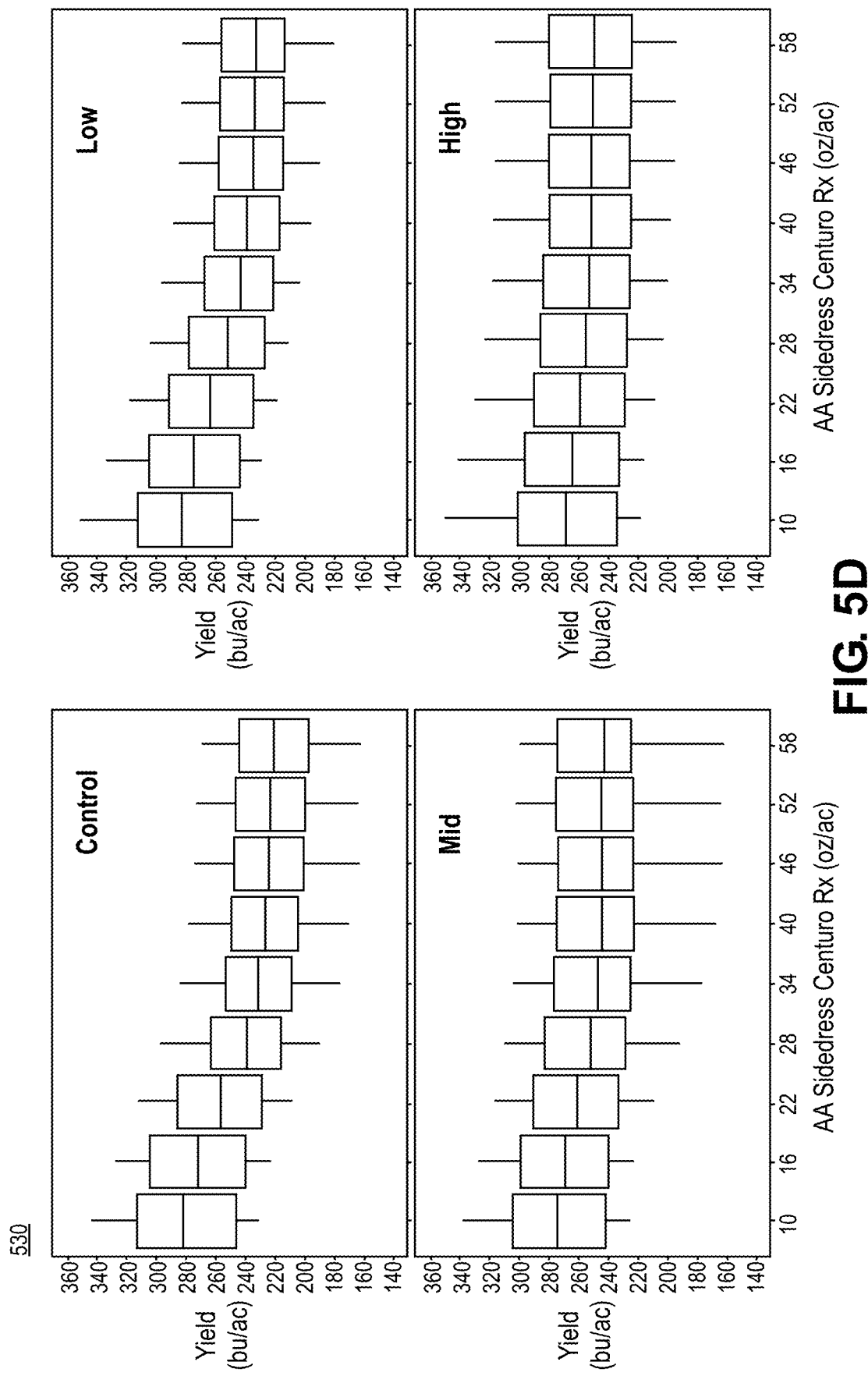
FIG. 5D depicts example candlestick charts depicting yield as a function of nitrogen inhibitor products according to application rate, according to some aspects.

FIG. 5C depicts an example scatterplot 520 depicting yield as a function of the recommended nitrogen inhibitor product rate with respect to the Centuro trial, according to some aspects. Initial analysis across all four treatments revealed a negative relationship between yield and the recommended Centuro rate. Segmenting the data by treatment revealed that as the Centuro rate increased, the slope of the relationship decreased, as shown in FIG. 5C. Rank correlations became less negative with increasing Centuro rates, indicating a decoupling of yield downside risk and high nitrogen loss potential (Table 3). FIG. 5D depicts example candlestick charts 530 depicting yield as a function of nitrogen inhibitor products according to application rate for each of the four Centuro treatments, according to some aspects.

TABLE 3

| Treatment | Slope | Rank Correlation |
|---|---|---|
| Control | −1.78 | −0.47 |
| Low | −1.33 | −0.42 |

TABLE 3-continued

| Treatment | Slope | Rank Correlation |
|---|---|---|
| Mid | −1.06 | −0.24 |
| High | −0.73 | −0.13 |

Figure 5E:
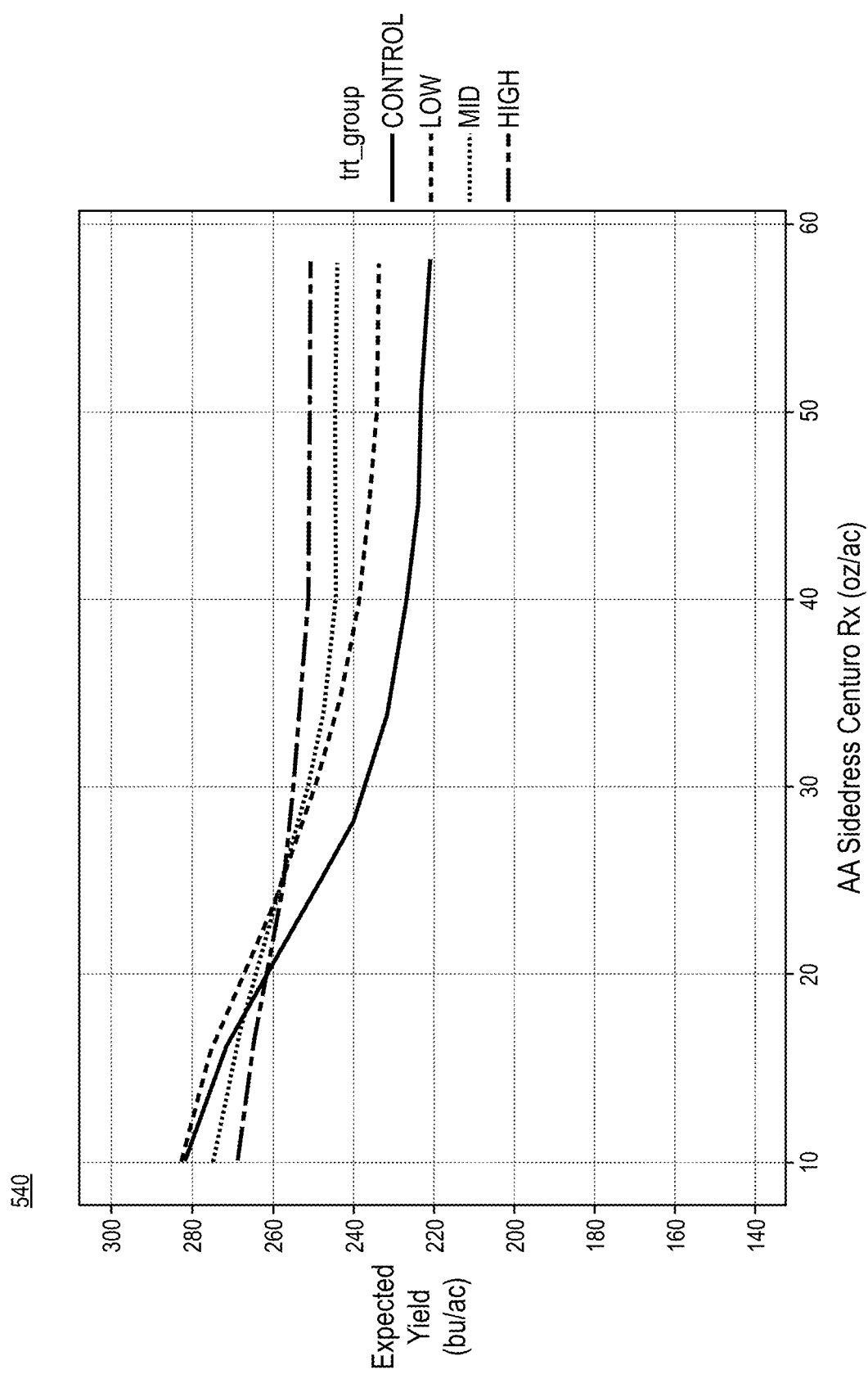
FIG. 5E depicts an example line chart depicting expected yield as a function of nitrogen inhibitor products, according to some aspects.

FIG. 5E depicts an example line chart 540 depicting expected yield as a function of nitrogen inhibitor products, according to some aspects. Specifically, in FIG. 5E, Monte Carlo results were plotted as a function of the recommended Centuro rate. As the Centuro rate increased (increasing nitrogen loss potential), the yield in the Control treatment declined at a greater rate compared to other treatments. In the areas of highest nitrogen loss potential (high Centuro rate), increasing rates of Centuro resulted in increased yield. In the areas of lowest nitrogen loss potential, the mid and high Centuro rates resulted in decreased yield. The Low rate of Centuro provided a slight yield advantage over the Control.

In general, nitrogen protectants (e.g., Centuro) provided a yield advantage over the untreated control. When segmented by SWI, a stairstep increase in yield was observed with increasing rates of Centuro. The study fields received significant amounts of precipitation during the 30 day period after side dress; yield reductions were observed in high nitrogen loss areas. Spatial efficacy of the present nitrogen loss prescriptions was clearly demonstrated because (i) yield loss was mitigated in high nitrogen loss areas as indicated by high recommended Centuro rates; (ii) in areas least-susceptible to nitrogen loss, high rates resulted in yield reductions (limits on nitrogen availability); and (iii) the low Centuro treatment provided a slight yield advantage over the control in the areas least susceptible to nitrogen loss. Results are easily extended to similar products that promote the stabilization of nitrogen fertilizer.

Exemplary Computer-Implemented Method Aspects

Figure 6:
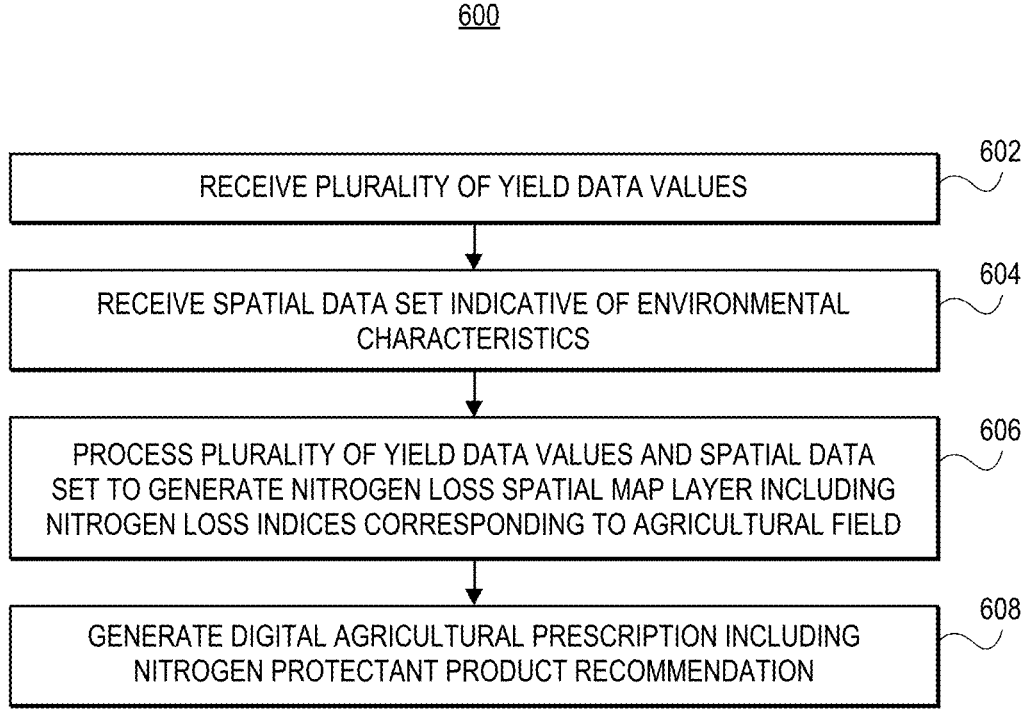
FIG. 6 depicts a flow diagram of an exemplary computer-implemented method for generating nitrogen loss spatial maps and nitrogen protectant recommendations, according to some aspects.

FIG. 6 depicts a flow diagram of an exemplary computer-implemented method 600 for computing nitrogen loss potential and mitigating nitrogen loss in agricultural fields by generating nitrogen loss spatial maps and nitrogen protectant recommendations. The method 600 may be performed by one or more elements of the environment 100 of FIG. 1, for example.

The method 600 may include receiving, via one or more processors (e.g., the CPU 110 and/or the CPU 140), a plurality of yield data values each corresponding to a respective portion of an agricultural field (block 602). The yield data values may be represented in a spatial file (e.g., a shapefile) and/or depicted as shown in FIG. 2B, FIG. 3A and/or FIG. 3B, in some aspects.

In some aspects, receiving the plurality of yield data values each corresponding to the respective portion of the agricultural field may include receiving, via an electronic network (e.g., the network 108), the plurality of yield data values each corresponding to the respective portion of the agricultural field as respective corn yield data values from a combine (e.g., the implement 104). Each respective corn yield data value may correspond to an individual hexagrid of the agricultural field. In some aspects, the received yield data my include one or more field identifiers, so that yield data corresponding to multiple agricultural fields may be collected at once and processed/stored.

The method 600 may include receiving, via one or more processors, a spatial data set indicative of environmental characteristics of the field (block 604). For example, the spatial data set indicative of environmental characteristics of the field may include one or both of (i) topographic data including at least one of elevation, slope or soil wetness index, and (ii) aerial imagery. In some aspects, the topographical data may include elevation only and derivatives of elevation may be computed by the topographic and imaging module 152. The aerial imagery may include imagery collected by any suitable device/system (e.g., satellite, drone/ UAV, airplane, etc.). The aerial imagery may include spectral data (e.g., near-infrared) and/or photographic imagery. The remote computing device 106 may include one or more machine learning models (e.g., one or more convolutional neural networks) that may process the aerial imagery as discussed herein.

The method 600 may include processing the plurality of yield data values and the spatial data set to generate a nitrogen loss spatial map layer including a nitrogen loss index value corresponding to each respective portion of the agricultural field (block 606).

In some aspects, processing the plurality of yield data values and the spatial data set to generate the nitrogen loss spatial map layer including the nitrogen loss index value corresponding to each respective portion of the agricultural field may include causing the nitrogen loss spatial map layer to be displayed in a display device (e.g., the output device 184, the output device 124 and/or in an output device of a user device such as the client computing device 102B). For example, the user may be an agronomist or customer who wants to gain a visual understanding of the nitrogen loss of one or more fields.

In some aspects, processing the plurality of yield data values and the spatial data set to generate the nitrogen loss spatial map layer including the nitrogen loss index value corresponding to each respective portion of the agricultural field may include receiving a download request from a user device; and in response to receiving the download request, transmitting, via an electronic network, the nitrogen loss spatial map layer to a computing device.

The method 600 may include generating, based on the nitrogen loss spatial map layer, a digital agricultural prescription including a respective prescription value of a nitrogen protectant product for each respective portion of the agricultural field (block 608).

In some aspects, generating, based on the nitrogen loss spatial map layer, the digital agricultural prescription including a respective prescription value of the nitrogen protectant product for each respective portion of the agricultural field may include causing the digital agricultural prescription to be transmitted to an implement for execution on the agricultural field. In some aspects, the method 600 may cause the implement to begin executing the agricultural prescription.

In some aspects, the method 600 may include receiving a download request from a user, and in response to receiving the download request, transmitting one or more of the generated digital agricultural prescriptions to the user. For example, this may be performed when the user is a manager of a field (or other user) who desires to obtain the prescription to treat the user's field with a nitrogen inhibitor/protectant. In that case, the user may download the prescription and load the prescription into an implement (e.g., the implement 104 or another implement).

In some aspects, the method 600 may further include receiving one or more inputs from a device of a user, the one or more inputs indicating at least one of: a selection of the nitrogen protectant product, yield data corresponding to the agricultural field, or topographic data corresponding to the agricultural field. For example, the user may be prompted to select from among several nitrogen protectant products (e.g., Centuro). The user may provide yield data and/or topographic data corresponding to the user's field. The method 600 may include retrieving additional data in some aspects (e.g., imagery, field boundary data, elevation data, etc.). The method 600 may compute derivatives of elevation and then generate a digital agricultural prescription, and provide the generated prescription as a download to the user. In some aspects, rather than providing the digital prescription as a download, the method 600 may include transmitting the digital prescription to an implement, and/or causing the implement to execute the prescription on the agricultural field.

Additional Considerations

Although the following text sets forth a detailed description of numerous different aspects, it should be understood that the legal scope of the invention may be defined by the words of the claims set forth at the end of this patent. The detailed description is to be construed as exemplary only and does not describe every possible aspect, as describing every possible aspect would be impractical, if not impossible. One could implement numerous alternate aspects, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain aspects are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example aspects, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various aspects, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering aspects in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In aspects in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example aspects, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example aspects, the processor or processors may be located in a single location (e.g., within a home environment, an office environment, or as a server farm), while in other aspects the processors may be distributed across a number of locations.

The performance of certain of the operations may be distributed among the one or more processors, not only residing within a single machine, but deployed across a number of machines. In some example aspects, the one or more processors or processor-implemented modules may be located in a single geographic location (e.g., within a home environment, an office environment, or a server farm). In other example aspects, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one aspect" or "an aspect" means that a particular element, feature, structure, or characteristic described in connection with the aspect may be included in at least one aspect. The appearances of the phrase "in one aspect" in various places in the specification are not necessarily all referring to the same aspect.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the aspects herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible aspect, as describing every possible aspect would be impractical.

What is claimed:

1. A computing system for computing nitrogen loss potential and mitigating nitrogen loss in agricultural fields by generating nitrogen loss spatial maps and nitrogen protectant recommendations, the computing system comprising:
   one or more processors; and
   a memory having instructions stored thereon that, when executed by the one or more processors, cause the computing system to:
   receive, via the one or more processors, a plurality of yield data values each corresponding to a respective portion of an agricultural field;
   receive, via the one or more processors, a spatial data set indicative of environmental characteristics of the field;
   process the plurality of yield data values and the spatial data set to generate a nitrogen loss spatial map layer including a nitrogen loss index value corresponding to each respective portion of the agricultural field; and
   generate, based on the nitrogen loss spatial map layer, a digital agricultural prescription including a respective prescription value of a nitrogen protectant product for each respective portion of the agricultural field.

2. The computer system of claim 1, the memory having stored thereon further instructions that, when executed by the one or more processors, cause the computing system to:

receive, via an electronic network, the plurality of yield data values each corresponding to the respective portion of the agricultural field as respective corn yield data values from a combine.

3. The computer system of claim 1, wherein the spatial data set indicative of environmental characteristics of the field includes one or both of (i) topographic data including at least one of elevation, slope or soil wetness index, and (ii) aerial imagery.

4. The computer system of claim 1, the memory having stored thereon further instructions that, when executed by the one or more processors, cause the computing system to:
cause the nitrogen loss spatial map layer to be displayed in a display device.

5. The computer system of claim 1, the memory having stored thereon further instructions that, when executed by the one or more processors, cause the computing system to:
receive a download request from a user device; and
transmit, via an electronic network, the nitrogen loss spatial map layer to the user device.

6. The computer system of claim 1, the memory having stored thereon further instructions that, when executed by the one or more processors, cause the computing system to:
cause the digital agricultural prescription to be transmitted to an implement for execution on the agricultural field.

7. The computer system of claim 1, the memory having stored thereon further instructions that, when executed by the one or more processors, cause the computing system to:
receive one or more inputs from a device of a user, the one or more inputs indicating at least one of: a selection of the nitrogen protectant product, yield data corresponding to the agricultural field, or topographic data corresponding to the agricultural field.

8. A computer-implemented method for quantifying and mitigating nitrogen loss in agricultural fields by generating nitrogen loss spatial maps and nitrogen protectant recommendations, the method comprising:
receiving, via one or more processors, a plurality of yield data values each corresponding to a respective portion of an agricultural field;
receiving, via one or more processors, a spatial data set indicative of environmental characteristics of the field;
processing the plurality of yield data values and the spatial data set to generate a nitrogen loss spatial map layer including a nitrogen loss index value corresponding to each respective portion of the agricultural field; and
generating, based on the nitrogen loss spatial map layer, a digital agricultural prescription including a respective prescription value of a nitrogen protectant product for each respective portion of the agricultural field.

9. The computer-implemented method of claim 8, wherein receiving the plurality of yield data values each corresponding to the respective portion of the agricultural field includes receiving, via an electronic network, the plurality of yield data values each corresponding to the respective portion of the agricultural field as respective corn yield data values from a combine.

10. The computer-implemented method of claim 8, wherein the spatial data set indicative of environmental characteristics of the field includes one or both of (i) topographic data including at least one of elevation, slope or soil wetness index, and (ii) aerial imagery.

11. The computer-implemented method of claim 8, wherein processing the plurality of yield data values and the spatial data set to generate the nitrogen loss spatial map layer including the nitrogen loss index value corresponding to each respective portion of the agricultural field includes causing the nitrogen loss spatial map layer to be displayed in a display device.

12. The computer-implemented method of claim 8, wherein processing the plurality of yield data values and the spatial data set to generate the nitrogen loss spatial map layer including the nitrogen loss index value corresponding to each respective portion of the agricultural field includes receiving a download request from a user device; and in response to receiving the download request, transmitting, via an electronic network, the nitrogen loss spatial map layer to a computing device.

13. The computer-implemented method of claim 8, wherein generating, based on the nitrogen loss spatial map layer, the digital agricultural prescription including a respective prescription value of the nitrogen protectant product for each respective portion of the agricultural field includes causing the digital agricultural prescription to be transmitted to an implement for execution on the agricultural field.

14. The computer-implemented method of claim 8, further comprising:
receiving one or more inputs from a device of a user, the one or more inputs indicating at least one of: a selection of the nitrogen protectant product, yield data corresponding to the agricultural field, or topographic data corresponding to the agricultural field.

15. A non-transitory computer readable medium containing program instructions that when executed by one or more processors, cause a computer to:
receive, via the one or more processors, a plurality of yield data values each corresponding to a respective portion of an agricultural field;
receive, via the one or more processors, a spatial data set indicative of environmental characteristics of the field;
process the plurality of yield data values and the spatial data set to generate a nitrogen loss spatial map layer including a nitrogen loss index value corresponding to each respective portion of the agricultural field; and
generate, based on the nitrogen loss spatial map layer, a digital agricultural prescription including a respective prescription value of a nitrogen protectant product for each respective portion of the agricultural field.

16. The non-transitory computer readable medium of claim 15, including further instructions that, when executed by one or more processors, cause a computer to:
receive, via an electronic network, the plurality of yield data values each corresponding to the respective portion of the agricultural field as respective corn yield data values from a combine.

17. The non-transitory computer readable medium of claim 15, including further instructions that, when executed by one or more processors, cause a computer to:
cause the nitrogen loss spatial map layer to be displayed in a display device.

18. The non-transitory computer readable medium of claim 15, including further instructions that, when executed by one or more processors, cause a computer to:
receive a download request from a user device; and
transmit, via an electronic network, the nitrogen loss spatial map layer to the user device.

19. The non-transitory computer readable medium of claim 15, including further instructions that, when executed by one or more processors, cause a computer to:
cause the digital agricultural prescription to be transmitted to an implement for execution on the agricultural field.

20. The non-transitory computer readable medium of claim 15, including further instructions that, when executed by one or more processors, cause a computer to:

receive one or more inputs from a device of a user, the one or more inputs indicating at least one of: a selection of the nitrogen protectant product, yield data corresponding to the agricultural field, or topographic data corresponding to the agricultural field.

\* \* \* \* \*